(12) United States Patent
Yagihashi et al.

(10) Patent No.: US 11,731,769 B2
(45) Date of Patent: Aug. 22, 2023

(54) EJECTION DEVICE AND FLYING BODY PROVIDED WITH EJECTION DEVICE

(71) Applicant: NIPPON KAYAKU KABUSHIKI KAISHA, Tokyo (JP)

(72) Inventors: Yasuhiko Yagihashi, Tokyo (JP); Shoichi Ashida, Tokyo (JP); Maiko Fukumoto, Tokyo (JP); Takahiro Ooi, Tokyo (JP); Hideki Otsubo, Tokyo (JP); Hiroshi Nakamura, Tokyo (JP); Akihiro Tamashiro, Tokyo (JP)

(*) Notice: Subject to any disclaimer, the term of this patent is extended or adjusted under 35 U.S.C. 154(b) by 450 days.

(21) Appl. No.: 17/057,668

(22) PCT Filed: Jun. 25, 2019

(86) PCT No.: PCT/JP2019/025258
§ 371 (c)(1),
(2) Date: Nov. 22, 2020

(87) PCT Pub. No.: WO2020/004426
PCT Pub. Date: Jan. 2, 2020

(65) Prior Publication Data
US 2021/0206497 A1 Jul. 8, 2021

(30) Foreign Application Priority Data

Jun. 25, 2018 (JP) ................................ 2018-120221
Mar. 13, 2019 (JP) ................................ 2019-046561

(51) Int. Cl.
*B64D 17/72* (2006.01)
*B64C 39/02* (2023.01)
(Continued)

(52) U.S. Cl.
CPC .......... *B64D 17/725* (2013.01); *B64C 39/024* (2013.01); *B64U 10/13* (2023.01); *B64U 70/83* (2023.01)

(58) Field of Classification Search
CPC .... B64D 17/72; B64D 17/725; B64C 39/024; B64U 10/13; B64U 70/83
See application file for complete search history.

(56) References Cited

U.S. PATENT DOCUMENTS

| 10,421,552 B2 | 9/2019 | Tsaliah et al. |
| 2016/0221681 A1* | 8/2016 | Babovka ............... B64C 39/024 |
| 2016/0318615 A1 | 11/2016 | Pick |

FOREIGN PATENT DOCUMENTS

| EP | 3050805 A1 | 8/2016 |
| KR | 101723743 B1 * | 4/2017 |
| WO | 2016/182750 A1 | 11/2016 |

OTHER PUBLICATIONS

ISR; Japan Patent Office; Tokyo; dated Aug. 13, 2019.

* cited by examiner

*Primary Examiner* — Christopher D Hutchens
(74) *Attorney, Agent, or Firm* — Patshegen IP; Moshe Pinchas

(57) ABSTRACT

Provided are an ejection device with reduced weight without reducing an ejection speed of an ejected object and a flying object including the ejection device. An ejection device 100 includes a piston member 10, a cylinder 14 which accommodates the piston member 10 and is provided with a hole portion 13 for allowing the piston member 10 to project outward during operation, a push-up member 15 pushed up in one direction by the piston member 10, an ejected object 16 pushed up while being supported by the push-up member 15, and a gas generator 17 which moves the piston member 10 in the cylinder 14, and in the ejection device 100, the push-up member 15 has a support portion 20 disposed on a distal end side of the piston member 10 with a tip of the piston member 10 in a moving direction of the piston member 10 set as a reference.

11 Claims, 32 Drawing Sheets

(51) Int. Cl.
*B64U 10/13* (2023.01)
*B64U 70/83* (2023.01)

(a)

(b)

EJECTION DEVICE AND FLYING BODY PROVIDED WITH EJECTION DEVICE

TECHNICAL FIELD

The present invention relates to an ejection device which ejects an ejected object such as a parachute or a paraglider, and a flying object including the ejection device.

BACKGROUND ART

In recent years, with the development of autonomous control technology and flight control technology, an industrial use of a flying object equipped with a plurality of rotors, for example, called a drone, is accelerating. A drone flies by, for example, rotating a plurality of rotors simultaneously in a balanced manner. Ascent and descent are done by increasing or decreasing the number of rotations of the rotors, and movement forward and rearward is done by inclining an airframe by increasing or decreasing the number of rotations of the rotors. Such flying objects are expected to expand worldwide in the future.

On the other hand, the risk of fall accidents of flying objects as described above is considered to be dangerous and hinders spread of the flying objects. In order to reduce the risk of such fall accidents, a parachute device for flying objects is being commercialized as a safety device.

As a parachute deploying apparatus of the above parachute device for flying objects, for example, Patent Literature 1 discloses a technique of deploying a parachute by connecting the parachute and each projectile with a cord and ejecting the projectiles in different directions. Furthermore, for example, Patent Literature 2 discloses a parachute deploying apparatus in which a push-up portion that pushes up and ejects the parachute is provided under a parachute provided in a container.

CITATIONS LIST

Patent Literatures

Patent Literature 1: US 20160251083 A1
Patent Literature 2: EP 3050805 B1

SUMMARY OF INVENTION

Technical Problems

From the viewpoint of safety, when a flying object drops due to a failure or the like, it is desired to reduce a dropping speed of the flying object as much as possible. To that end, it is important to reduce the weight of the flying object and to improve an ejection speed of a parachute or the like and a deployment speed after ejection. This is because the weight reduction of the flying object contributes to prolonging a flight time of the flying object, and the improvement of the ejection speed and the deployment speed of the parachute or the like contributes to reducing the dropping speed of the flying object.

In order to increase the ejection speed, it is necessary to apply a force of a power source to an ejected object for a certain period of time to accelerate the ejected object. Therefore, a stroke of a piston is required in the mode in which the parachute is pushed up by the piston as in the above conventional technique. However, when the parachute is disposed above the push-up portion as in the above conventional technique, the container needs a space for accommodating the piston, and therefore, a size of the container in an ejection direction becomes large. As a result, there is a problem that the weight of the container increases.

Thus, it is an object of the present invention to provide an ejection device with reduced weight without reducing an ejection speed of an ejected object and a flying object including the ejection device.

Solutions to Problems (1) An ejection device according to the present invention has a sliding member, a cylinder that accommodates the sliding member inside and is provided with a hole portion configured to allow the sliding member to project outward from the inside during operation, a push-up member that has a bottomed cylindrical portion disposed to cover at least a portion of the cylinder and a flange-like portion formed to project outward from an opening portion of the bottomed cylindrical portion or an intermediate portion of a side surface of the bottomed cylindrical portion and is pushed up in one direction by the sliding member, an ejected object pushed up while being supported by the flange-like portion of the push-up member, and a power source that moves the sliding member in the cylinder such that the sliding member projects outward from the inside.

According to the configuration of (1), when the sliding member moves or extends in the cylinder by the power source and projects outside the cylinder through the hole, the push-up member is pushed up in one direction. As a result, the ejected object supported by the flange-like portion of the push-up member is pushed up and ejected. As a result, it is possible to save a space for accommodating the ejected object, as compared with the conventional structure in which the ejected object is disposed above or in front of the sliding member. As a result, the weight is not increased, so that the weight can be reduced. Corresponding to the movement of the sliding member in the cylinder, the push-up member moves and a stroke for pushing up the ejected object is secured, so that an ejection speed of the ejected object is not reduced. As described above, the weight can be reduced without reducing the ejection speed of the ejected object.

(2) In the ejection device according to (1), it is preferable that a support portion of the bottomed cylindrical portion be provided with a hole (drilling) or formed into a mesh shape (mesh processing) to partially remove a wall portion. As a result, the weight of the bottomed cylindrical portion can be further reduced, and thus the weight of the entire ejection device can be reduced.

(3) In the ejection device according to (1) or (2), it is preferable that the flange-like portion include a plurality of projecting portions formed into a disc shape or a polygon, or formed radially.

According to the configuration of (3), by forming the flange-like portion of the push-up member specifically as described above, it is possible to achieve the structure capable of saving the space for accommodating the ejected object, as compared with the structure in which the ejected object is disposed above or in front of the sliding member, as described above. By forming the flange-like portion of the push-up member radially with the plurality of projecting portions, the weight of the push-up member can be reduced, and thus the weight of the entire ejection device can be further reduced.

(4) The ejection devices according to (1) to (3) preferably further include a container that accommodates the sliding member, the cylinder, the push-up member, the ejected object, and the power source.

According to the configuration of (4), when the ejection device is mounted on a flying object, it is possible to prevent deterioration and dropping of the sliding member, the cylinder, the push-up member, the ejected object, and the power source due to rain or the like.

(5) In the ejection device according to (4), it is preferable that the ejected object be accommodated in a portion of the container between an inner surface of the container and an outer surface of the bottomed cylindrical portion.

According to the configuration of (5), it is possible to save the space for accommodating the ejected object and prevent the ejection device from becoming large, and thus the weight of the ejection device can be reduced.

(6) In the ejection device according to (4) or (5), it is preferable that a lid be provided at an end of the container on a downstream side in an ejection direction of the ejected object.

According to the configuration of (6), it is possible to prevent moisture absorption and deterioration of the ejected object (for example, parachute).

(7) In the ejection device according to any one of (3) to (6), it is preferable that the container be provided with a vent hole that suppresses negative pressure generated between the container and the push-up member during operation.

When the push-up member moves rapidly, a negative pressure is generated in a region between the push-up member and the container. Thus, it becomes difficult to move the push-up member. Thus, according to the configuration of (7), by providing the vent hole, a negative pressure phenomenon can be reduced, and the push-up member can be smoothly moved.

(8) The ejection device according to any one of (1) to (7) may further include a driving sliding member that is provided in the cylinder and moves the sliding member in a contact or non-contact manner.

According to the configuration of (8), by disposing the sliding member so that the sliding member can move only when a considerable pressure is applied, when the power source operates, a considerable amount of compressed air can be accumulated between the driving sliding member and the sliding member. The sliding member can be urged and moved by the compressed air. As a result, the push-up member is also urged, so that the ejection speed of the ejected object can be increased.

(9) The ejection device according to any one of (1) to (8) may further include a relay member that receives pressure from the power source and moves the sliding member. The relay member is a member that receives a physical force and transmits the received force to another member or the like via the relay member.

According to the configuration of (9), power can be instantaneously transmitted to the sliding member. It is convenient because the relay member such as a ring gear or a power transmission member employed in a seat belt pretensioner can be diverted as it is. Here, examples of the power source include a gas generator that generates gas by burning explosives, and a gas generator that opens a valve of a gas cylinder and jets compressed gas inside by burning explosives.

As the explosive gas generator, only an igniter may be used, or a gas generator including the igniter and a gas generating agent may be used. A hybrid-type or stored-type gas generator may be used in which a sealing plate in a small gas cylinder is cleaved by an explosive igniter and an internal gas is discharged to the outside. In this case, as a pressurized gas in the gas cylinder, a non-combustible gas such as argon, helium, nitrogen, or carbon dioxide, or a mixture of these gases can be used. In order to reliably propel the piston at the time of emission of pressurized gas, a heat generator composed of a gas generating agent composition, a thermite composition, or the like may be provided in the gas generator.

(10) In the ejection device according to any one of (1) to (9), preferably, the ejected object includes a lift force generating member having a control line, and the ejection device further includes a steering mechanism connected to the control line such that the lift force generating member is steerable.

According to the configuration of (10), the lift force generating member is steered (for example, an operation of changing an inclination angle of the lift force generating member is performed by an operation of winding or feeding the control line) by the steering mechanism after ejection of the ejected object, so that a traveling direction of the flying object can be operated, and flight stability can be improved as compared with the conventional case.

(11) A flying object according to the present invention includes an airframe, the ejection device according to any one of (1) to (10) coupled to the airframe, and a propulsion mechanism coupled to the airframe and propelling the airframe.

According to the configuration of (11), since the ejection device according to any one of (1) to (10) is provided, weight reduction can be achieved without reducing the ejection speed of the ejected object, as in the above description.

Advantageous Effects of Invention

According to the present invention, it is possible to provide an ejection device with reduced weight without reducing the ejection speed of the ejected object and a flying object including the ejection device.

DESCRIPTION OF EMBODIMENTS

Hereinafter, an ejection device according to an embodiment of the present invention will be described with reference to the drawings.

First Embodiment

Figure 1:
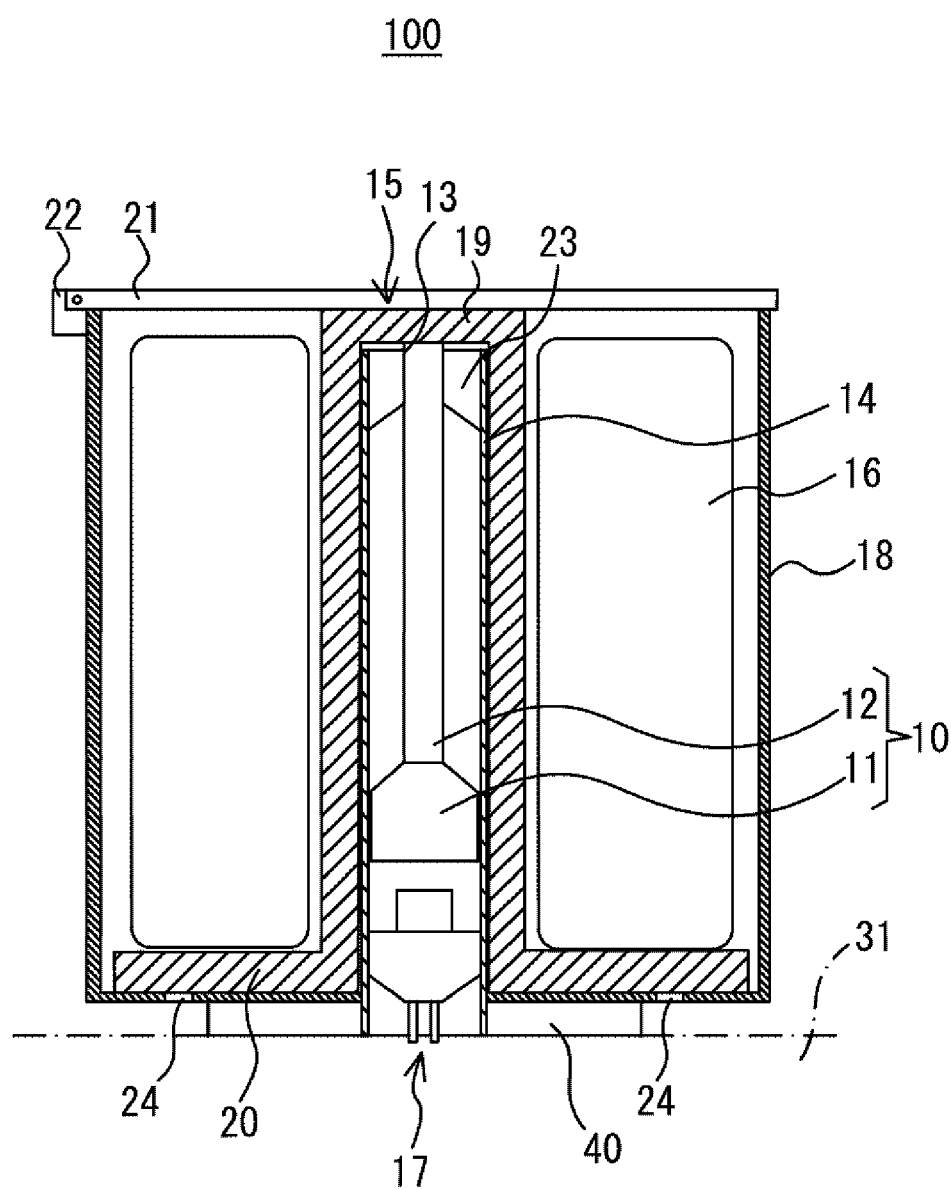
FIG. 1 is a cross-sectional view showing an ejection device according to a first embodiment of the present invention.

As shown in FIG. 1, an ejection device 100 according to the present embodiment includes a piston member 10 which is a sliding member, a cylinder 14 which accommodates the piston member 10 and is provided with a hole portion 13 for allowing the piston member 10 to project outward (upward in FIG. 1) during operation, a push-up member 15 pushed up in one direction (upward in FIG. 1) by the piston member 10, an ejected object 16 pushed up while being supported by the push-up member 15, a gas generator (such as a micro gas generator) 17 as a power source that moves the piston member 10 in the cylinder 14, and a bottomed cylindrical container 18 which accommodates the piston member 10, the cylinder 14, the push-up member 15, the ejected object 16, and the gas generator 17.

In the present embodiment, the ejected object 16 is a parachute or a paraglider. The gas generator 17 is disposed below a main body portion 11 of the piston member 10, which will be described later, in a state of being press-fitted into a lower opening end of the cylinder 14. A lower portion of the cylinder 14 is fixed to a bottom of the container 18.

The piston member 10 has the main body portion 11 including a portion having an outer diameter substantially the same as an inner diameter of the cylinder 14, and a rod-shaped portion 12 connected to the main body portion 11, extending upward, and having a diameter smaller than that of the main body portion 11. An upper end of the rod-shaped portion 12 is fixed to an inner surface of an upper end of a bottomed cylindrical portion 19 of the push-up member 15, which will be described later, through the hole portion 13 of the cylinder 14. A stopper 23 disposed so as to surround a portion of the rod-shaped portion 12 of the piston member 10 is provided in an upper portion of the cylinder 14. That is, the rod-shaped portion 12 is disposed so as to be inserted through the stopper 23. As a result, when the piston member 10 moves upward, the main body portion 11 comes into contact with the stopper 23 and stops, so that the main body portion 11 is prevented from being discharged outward from the inside of the cylinder 14.

As shown in FIG. 1, the push-up member 15 has the bottomed cylindrical portion 19, which is disposed so as to cover a portion of the cylinder 14, that is, an outer portion of the cylinder 14 excluding the opening end where the gas generator 17 is disposed, and a disc-shaped support portion 20 which is provided as a flange (flange-like portion) at an opening edge portion of the bottomed cylindrical portion 19 and supports the ejected object 16. In such a configuration, a bottom of the support portion 20 is provided so as to be abutted against an inner surface side of the bottom of the container 18 in the initial state. An outer peripheral portion of the support portion 20 is formed so as not to come into contact with an inside of the container 18. The bottom of the support portion 20 may not be abutted against the inner surface side of the bottom of the container 18 in the initial state.

A lid 21 is provided at an end of the container 18 on a downstream side in an ejection direction of the ejected object 16, that is, an upper end of the container 18. A portion of an end of the lid 21 is pivotally supported by a lid opening/closing mechanism 22 so as to be openable and closable. The lid opening/closing mechanism 22 may automatically open the lid 21 by a driving device such as a motor in accordance with operation of the gas generator 17. The lid 21 may have a structure that snaps into the container 18, or may have a structure that is separated from the container after opening and closing. The lid 21 may be coupled to the container 18 with a cord or the like.

Figure 2:
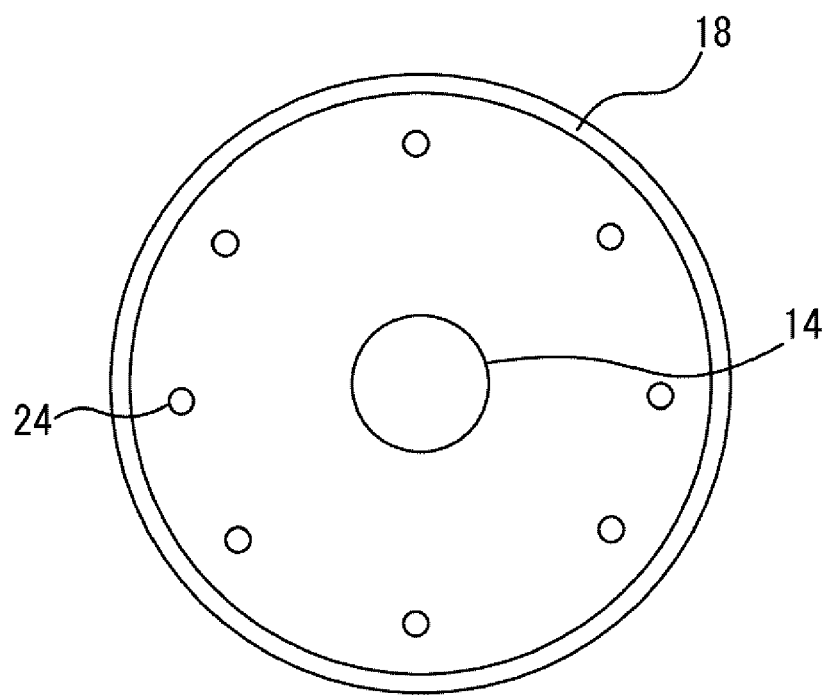
FIG. 2 is a plan view of a container in the ejection device of FIG. 1.

Here, as shown in FIGS. 1 and 2, the bottom of the container 18 is provided with a plurality of vent holes 24 which communicate the inside and the outside of the container 18. In each of the vent holes 24, when the push-up member 15 rapidly moves in the container 18, a negative pressure is generated in a region between the push-up member 15 and a bottom surface of the container 18. Thus, it becomes difficult to move the push-up member 15. Thus, by providing the vent hole 24, a negative pressure phenomenon can be reduced, and the push-up member 15 can be smoothly moved. The ejection speed and ejection distance of the ejected object 16 can be controlled by appropriately adjusting an opening area of the vent hole 24 together with output adjustment of the gas generator 17. Although the vent hole 24 may have any hole shape, a circular shape is particularly preferable.

The ejected object 16 is accommodated in the container 18 between the inner surface of the container 18 and an outside surface of the bottomed cylindrical portion 19 of the push-up member 15 so as to surround the outside surface of the bottomed cylindrical portion 19, for example. The ejected object 16 is folded such that the outside of the ejected object 16 does not come into contact with the inside of the container 18. Here, the ejected object 16 may be folded such that the outside of the ejected object 16 comes into contact with the inside of the container 18. The ejected object 16 is connected to, for example, one end of a cord (not shown), and the other end of the cord is connected to the inside of the container 18 or an airframe 31 of a flying object 30 described later.

In the configuration as described above, if the gas generator 17 is operated when, for example, a flying object on which the ejection device 100 is mounted drops, the piston member 10 propels upward in the cylinder 14 due to pressure of gas generated by the operation. Consequently, the push-up member 15 having the bottomed cylindrical portion 19 connected to the rod-shaped portion 12 of the piston member 10 propels upward in the container 18. As a result, the lid 21 is pushed up by an upper portion of the push-up member 15 and opened, and, at the same time, the ejected object 16 is ejected outward (upward in the plane of FIG. 1) from the inside of the container 18. When the ejected object 16 is a parachute or paraglider, the ejected object 16 is ejected from the container 18 and then deployed.

Figure 3:
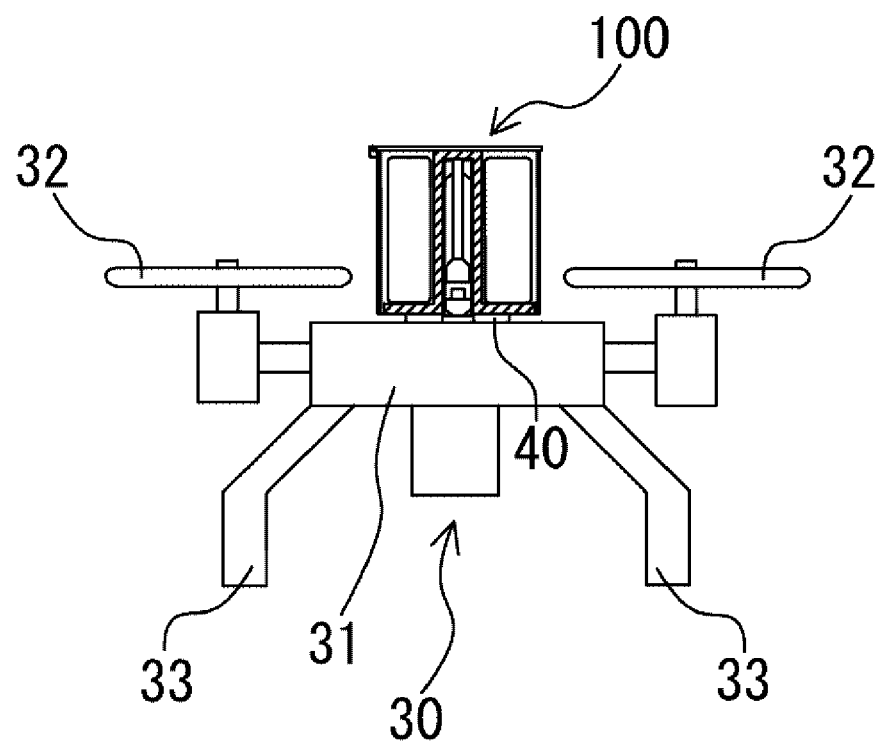
FIG. 3 is a diagram showing a flying object to which the ejection device of FIG. 1 is applied.

The ejection device 100 is connected and fixed to the airframe 31 of the flying object 30 via a connecting member 40, as shown in FIGS. 1 and 3. At this time, as shown in FIG. 1, the connecting member 40 connects the container 18 and the airframe 31 at a position where the vent hole 24 is not closed. Therefore, the flying object 30 includes the airframe 31, the ejection device 100 coupled to the airframe 31, one or more propulsion mechanisms (for example, propellers) 32 coupled to the airframe 31 and propelling the airframe 31, and a plurality of leg portions 33 provided at a lower portion of the airframe 31. Here, in practice, a socket for energization is mated with a lower electrode of the gas generator 17. However, this configuration is omitted from the form of expression in FIG. 1 for convenience of description.

As described above, according to the present embodiment, it is possible to save a space for accommodating the ejected object 16, as compared with the conventional structure in which the ejected object is disposed above or in front of the piston member. As a result, compactification can be achieved as compared with the conventional structure, so that the weight can be reduced. Corresponding to the movement of the piston member 10 in the cylinder 14, the support portion 20 of the push-up member 15 moves, and a sufficient stroke for pushing up the ejected object 16 is secured. As a result, the ejected object 16 is sufficiently accelerated, and the ejection speed of the ejected object 16 is not reduced. Therefore, according to the ejection device 100 of the present embodiment, the weight can be reduced without reducing the ejection speed of the ejected object 16.

In the present embodiment, the piston member 10, the cylinder 14, the push-up member 15, the ejected object 16, and the gas generator 17 are accommodated in the container 18. Consequently, when the ejection device 100 is mounted on the flying object 30, it is possible to prevent deterioration and dropping of the piston member 10, the cylinder 14, the push-up member 15, the ejected object 16, and the gas generator 17 due to rain or the like.

In the present embodiment, the ejected object 16 is accommodated in the container 18 between the inner surface of the container 18 and the outer surface of the bottomed cylindrical portion 19. This makes it possible to save the space for accommodating the ejected object 16 and prevent the ejection device 100 from becoming large, and thus the weight of the ejection device 100 can be reduced.

In the present embodiment, since the container 18 is provided with the lid 21, it is possible to prevent moisture absorption and deterioration of the ejected object 16 such as a parachute.

Furthermore, in the present embodiment, the gas generator 17 is press-fitted into the cylinder 14, so that the gas generator 17 can be firmly fixed.

Second Embodiment

Next, an ejection device according to the second embodiment will be described. In the present embodiment, components with the same last two digits as those in the above first embodiment are the same as those described in the first embodiment unless otherwise described, and therefore the description thereof is omitted. The same applies to the drawings in each of the following embodiments. In FIG. 4(b), the same applies to components with the same last two digits as those in FIG. 4(a). Since components not particularly described are the same as those in the first embodiment, and the description and illustration will be omitted. In each of the following embodiments, as a general rule, differences from the first embodiment will be mainly described.

As shown in FIG. 4(a), in an ejection device 200 of the present embodiment, at portions of a substantially circular support portion 220, which face each other in a radial direction, projecting portions 230 which respectively project outward in the radial direction are provided. A guide 231 for guiding the projecting portion 230 is provided at a position of a container 218 corresponding to a portion where each of the projecting portions 230 is provided. With such a configuration, the support portion 220 can be pushed up more stably than in the ejection device 100 of FIG. 1, so that an ejected object (such as a parachute) can be stably ejected in the ejection direction.

The ejection device 200 of FIG. 4(a) may be modified like an ejection device 300 of FIG. 4(b).

As shown in FIG. 4(b), in the ejection device 300, a disc-shaped support portion 340 having a smaller diameter than the support portion 220 of FIG. 4(a) is adopted, and a plurality of linear portions 341 arranged radially with a center of the support portion 340 set as a reference are provided. With such a configuration, it is possible to further reduce the weight of the support portion 340 (the linear portion 341) as compared to the mode of FIG. 4(a), which can further contribute to improvement of the ejection speed.

Third Embodiment

Figure 5:
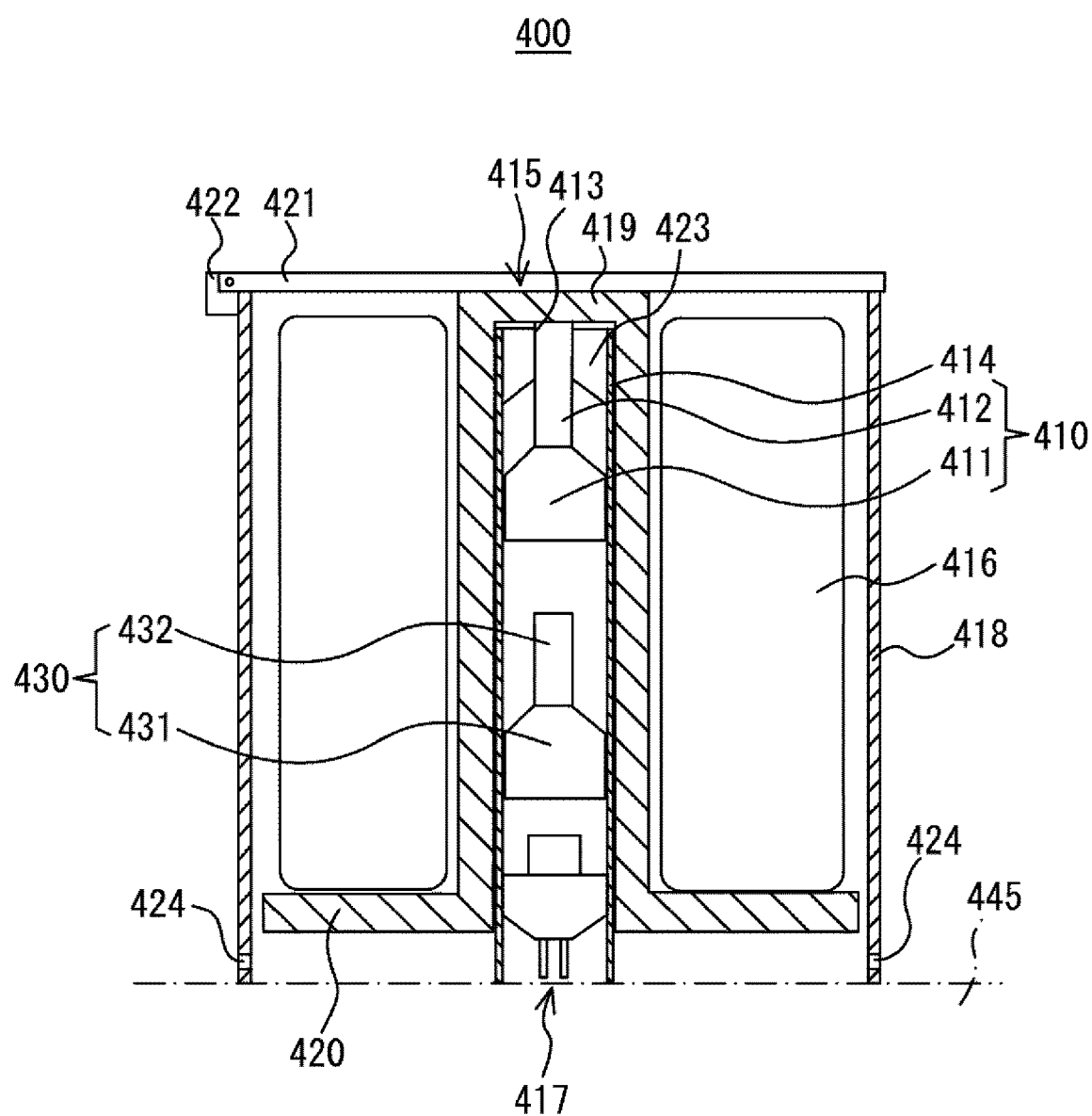
FIG. 5 is a cross-sectional view showing an ejection device according to a third embodiment.

Next, an ejection device according to the third embodiment will be described. As shown in FIG. 5, in an ejection device 400 of the third embodiment, a driving piston member 430 which has a main body portion 431 and a rod-shaped portion 432, and is a driving sliding member, which moves a piston member 410 in a non-contact (or contact) manner, is provided in a cylinder 414. A container 418 has a plurality of vent holes 424 near a lower end of a position lower than a position of a support portion 420, and the lower end is fixed to an airframe 445 of a flying object. A lower end of the cylinder 414 is fixed to the airframe 445 of the flying object.

According to this configuration, by disposing the piston member 410 such that the piston member 410 can move only when a considerable pressure is applied, when a gas generator 417 is operated, a considerable amount of compressed air can be accumulated between the driving piston member 430 and the piston member 410. Then, the compressed air can urge and move the piston member 410. As a result, a push-up member 415 is also urged, so that the ejection speed of an ejected object 416 can be increased.

Fourth Embodiment

Figure 6:
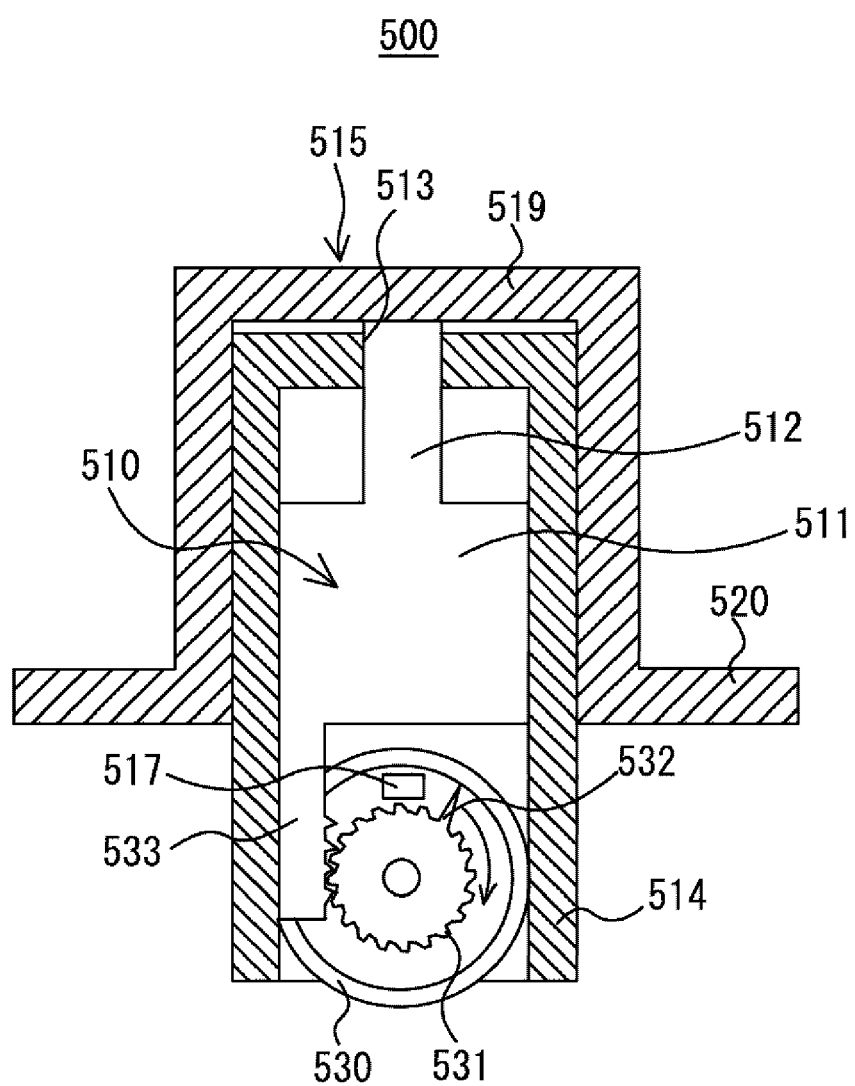
FIG. 6 is a simplified sectional view showing an ejection device according to a fourth embodiment.

Next, in an ejection device according to the fourth embodiment, differences from the first embodiment will be mainly described. As shown in FIG. 6 (the same components as in the first embodiment are not shown), in an ejection device 500 of the fourth embodiment, a push-up member 515 has a flange-like support portion 520 in an intermediate portion of a cylinder 514. A rack 533 is provided on a lower surface of a main body portion 511 of a piston member 510. Inside the cylinder 514, below the main body portion 511, a substantially circular cover 530 is provided, which is cut out only in the region into which the rack 533 slidably enters. The cover 530 includes a pinion 531 having a protruding portion 532 extending just ahead of an inner surface of the cover 530, and a gas generator 517 disposed in a region between the pinion 531 and the inner surface of the cover 530. The pinion 531 and the rack 533 mesh with each other.

In such a configuration, when gas is generated by operation of the gas generator 517, the protruding portion 532 receives the pressure, so that the pinion 531 rotates clockwise in FIG. 6. As a result, the rack 533 moves upward, so that the push-up member 515 is pushed up. With the ejection device 500 having such a configuration, as in the first embodiment, it is possible to achieve the weight reduction without reducing the ejection speed of the ejected object.

Fifth Embodiment

Figure 7:
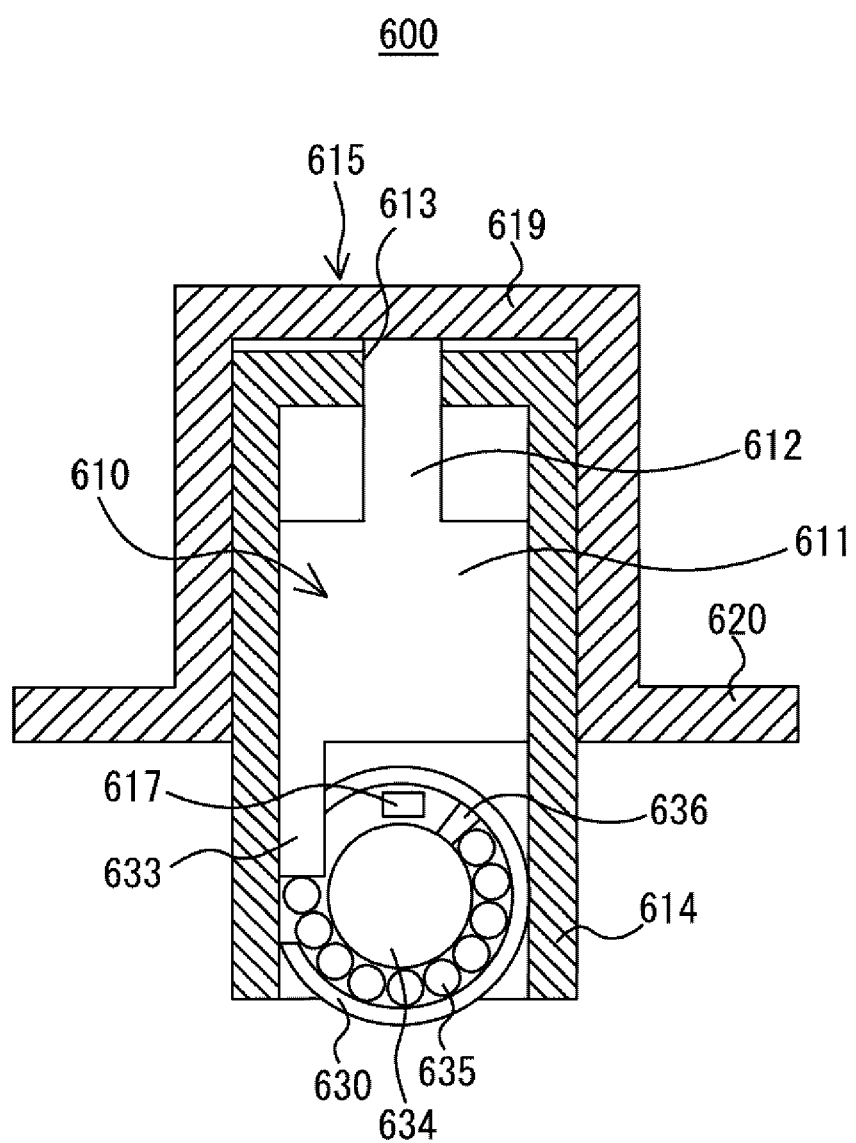
FIG. 7 is a simplified sectional view showing an ejection device according to a fifth embodiment.

Next, an ejection device according to the fifth embodiment will be described. As shown in FIG. 7 (the same components as in the first embodiment are not shown), in an ejection device 600 of the fifth embodiment, a rod-shaped pressed member 633 is provided on a lower surface of a main body portion 611 of a piston member 610. A substantially circular cover 630 which is cut out only in a region into which the pressed member 633 enters is provided below the main body portion 611 in a cylinder 614. The cover 630 includes a circular passage forming member 634 disposed concentrically with the cover 630, a gas generator 617 disposed in a region between an outer surface of the passage forming member 634 and an inner surface of the cover 630, a plurality of balls 635, and a piston 636.

In such a configuration, when gas is generated by operation of the gas generator 617, the piston 636 receives the pressure, and the rearmost ball 635 (the ball 635 on the gas generator 617 side) is pushed. Then, force is transmitted to the ball 635 at the top via force transmission between the balls 635 adjacent to each other. As a result, the pressed member 633 is pressed by the ball 635 at the top, and the pressed member 633 moves upward, so that a push-up member 615 is pushed up. With the ejection device 600 having such a configuration, as in the first embodiment, it is possible to achieve the weight reduction without reducing the ejection speed of the ejected object.

Sixth Embodiment

Instead of the ejection device 500 of the fourth embodiment and the ejection device 600 of the fifth embodiment described above, the following ejection device 700 may be adopted. As shown in FIGS. 8(a) to 8(c), the ejection device 700 of the sixth embodiment includes a ring gear 51 and a power transmission means 60 that transmits power to the ring gear 51. The same components as those in the first embodiment are not shown.

The power transmission means 60 has a power transmission member 61 configured to be engageable with an external teeth 51a of the ring gear 51, a pipe 62 for accommodating the power transmission member 61, a gas generator 63 disposed at an end of the pipe 62, a piston 64 which presses the power transmission member 61 by receiving gas generated by the gas generator 63, and a pretensioner cover 70 which forms a passage 71 of the power transmission member 61.

The pipe 62 is disposed so as to be curved. A rotary shaft 80 of a pinion 731 (see FIG. 9) meshed with a rack 733 (see FIG. 9) is provided coaxially with a pinion gear 81. Since the pinion 731 and the rack 733 have the same functions as the pinion 531 and the rack 533 of the above fourth embodiment, the details are omitted. An external teeth 81a formed on an outer circumference of the pinion gear 81 is configured to be engageable with an internal teeth 51b formed on an inner circumference of the ring gear 51. Normally, as shown in FIG. 8(a), a clearance is provided between the external teeth 81a of the pinion gear 81 and the internal teeth 51b of the ring gear 51, and the rotary shaft 80 and the pinion gear 81 are in a state of being rotatable without interfering with the ring gear 51.

The power transmission member 61 is formed of, for example, a spherical metal member (ball). The ring gear 51 is normally positioned by the pretensioner cover 70 so as not to interfere with the pinion gear 81. The external teeth 51a of the ring gear 51 is formed so as to have a valley engageable only with the power transmission member 61 at the top and a valley engageable with two second and subsequent power transmission members 61.

The pipe 62 is filled with a plurality of the power transmission members 61, and is normally supported by the external teeth 51a of the ring gear 51 so as not to move, as shown in FIG. 8(a). The passage 71 is formed inside the pretensioner cover 70 so that the power transmission member 61 can move on the outer periphery of the ring gear 51 along an inner wall of the pretensioner cover 70. As shown in FIG. 8(b), the piston 64 is disposed behind the rearmost power transmission member 61 accommodated in the pipe 62.

When the flying object is dropped, after the operation signal is transmitted to the gas generator 63, a high pressure gas generated by the gas generator 63 is jetted into the pipe 62. The high pressure gas causes the piston 64 to closely attach to an inner surface of the pipe 62 and slide in the pipe 62 while preventing leakage of the high pressure gas. By the sliding of the piston 64, the power transmission member 61 is pressed and moves in the pipe 62.

Figure 8:
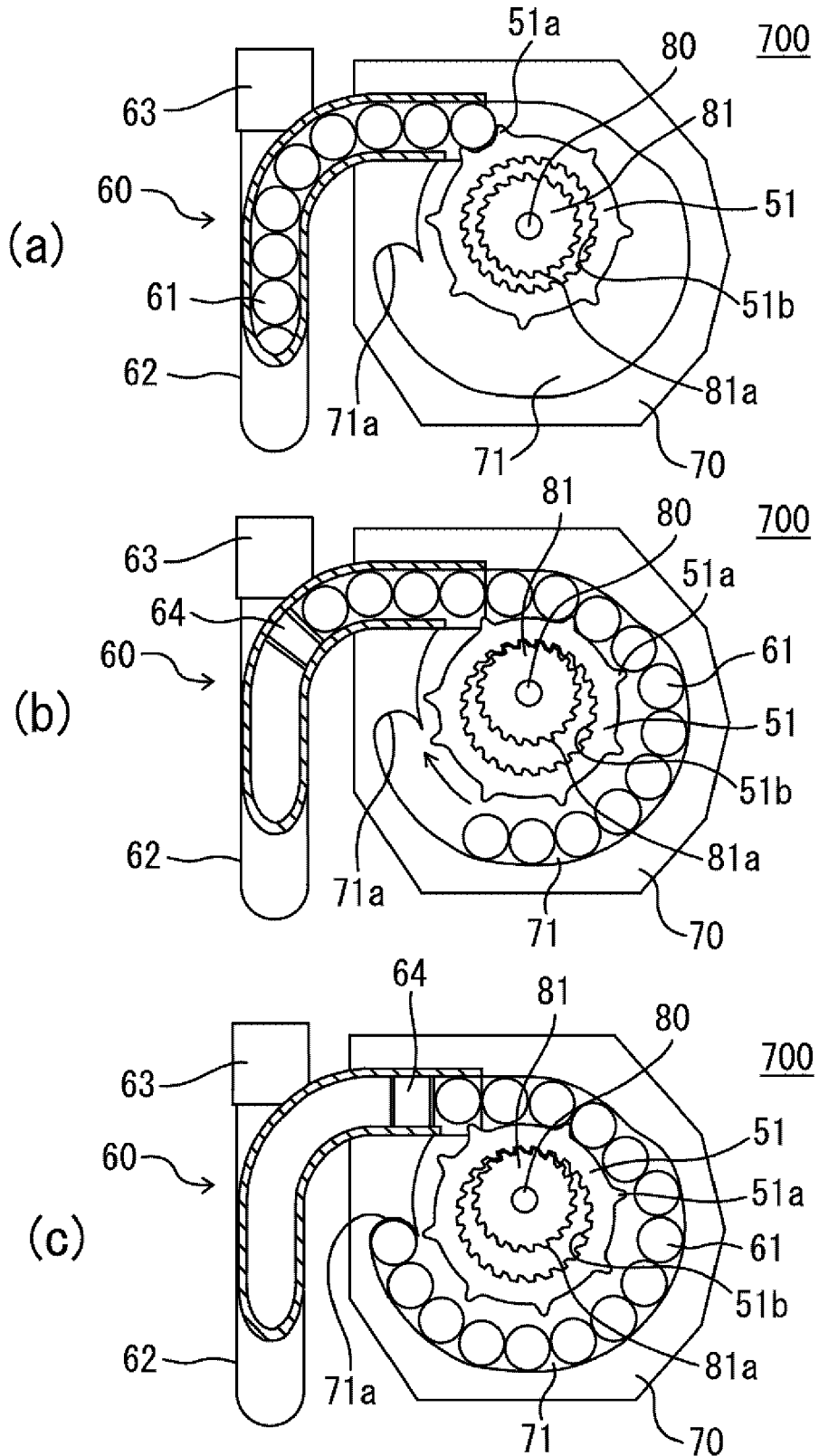
FIGS. 8(a) to (c) are simplified diagrams showing an operation of an ejection device according to a sixth embodiment.
Figure 9:
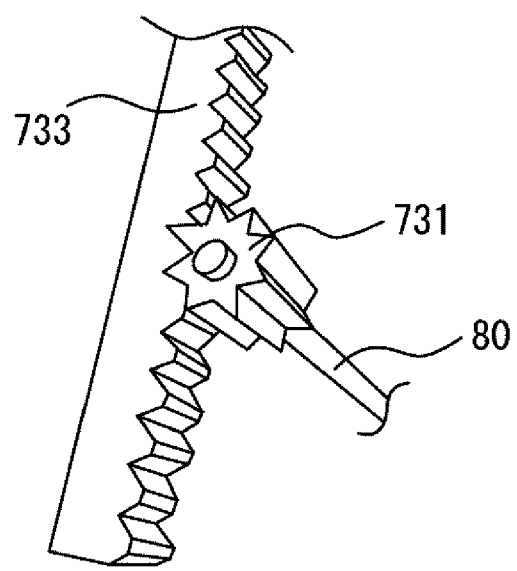
FIG. 9 is a perspective view showing a pinion and a rack applied to the ejection device of FIG. 8.

The power transmission member 61 at the top pushed out from the pipe 62 presses the ring gear 51 while engaging with the external teeth 51*a* of the ring gear 51, so that the ring gear 51 moves toward the pinion gear 81 as shown in FIG. 8(*b*). As a result, the internal teeth 51*b* of the ring gear 51 and the external teeth 81*a* of the pinion gear 81 engage with each other, and the pinion gear 81 can be rotated by the rotation of the ring gear 51, so that the pinion 731 (see FIG. 9) can be rotated via the rotary shaft 80 (see FIG. 9). As a result, the rack 733 can be moved to propel the piston member (not shown).

The high pressure gas supplied from the gas generator 63 discharges the power transmission member 61 sequentially from the pipe 62 to rotate the ring gear 51, and the power transmission member 61 then disengages from the ring gear 51 and moves along the passage 71. As shown in FIG. 8(*c*), the power transmission member 61 at the top comes into contact with a passage terminus portion 71*a* and stops.

With the ejection device 700 having the configuration as described above, as in the first embodiment, it is possible to achieve the weight reduction without reducing the ejection speed of the ejected object.

Thus, the embodiments of the present invention have been described hereinabove with reference to the drawings. However, the specific structure of the present invention shall not be interpreted as to be limited to the above described embodiments. The scope of the present invention is defined not by the above embodiments but by claims set forth below, and shall encompass the equivalents in the meaning of the claims and every modification within the scope of the claims.

In each of the above embodiments, the gas generator is adopted as the power source, but the configuration is not limited as long as a driving force for propelling the sliding member in the cylinder can be given to the sliding member, and an elastic body such as a spring may be adopted, for example.

In the first embodiment, the support portion 20 of the push-up member 15 is provided so as to be abutted against the bottom of the container 18. However, the present invention is not limited to this configuration. For example, similarly to the embodiment shown in FIGS. 6 and 7, the support portion 20 may be disposed near a middle of the rod-shaped portion 12 of the piston member 10 in a length direction.

In each of the above embodiments, the upper end of the rod-shaped portion is fixed to the inner surface of the upper end of the bottomed cylindrical portion of the push-up member. However, the present invention is not limited to this configuration, and the upper end of the rod-shaped portion may not be fixed to the inner surface.

In each of the above embodiments, the lid is provided in the container so as to be openable and closable by the lid opening/closing mechanism such as a hinge, a snap-in system, or a servomotor. However, the present invention is not limited to this configuration, and the lid may be provided in the container by being press-fitted into the container. In this case, in order to prevent dropping of the lid, it is desirable to connect the lid to the container with a cord or the like.

In each of the above embodiments, the container is provided. However, the present invention is not limited to this configuration, and the container is not an essential constituent member. That is, when there is no container, an outer periphery of the ejected object may be tied up and fastened with a string-like member or the like, and the ejected object may be deployed by cutting the string-like member during operation.

Although the container 18 is formed in a cylindrical shape in the first embodiment, the shape of the container 18 is not limited to the cylindrical shape, and the container 18 may be formed in another shape such as a square cylinder.

The piston member 10 in the first embodiment may be configured as a telescopic structure.

In each of the above embodiments, the ejection device has been described by adopting the piston member as the sliding member. However, hereinafter, a modification adopting a bellows member shown in FIGS. 10(*a*) and (*b*) instead of the piston member will be described. In the present modification, components with the same last two digits as those in the above embodiments are the same as those described in the above embodiments unless otherwise described, and therefore the description thereof is omitted.

Figure 10:
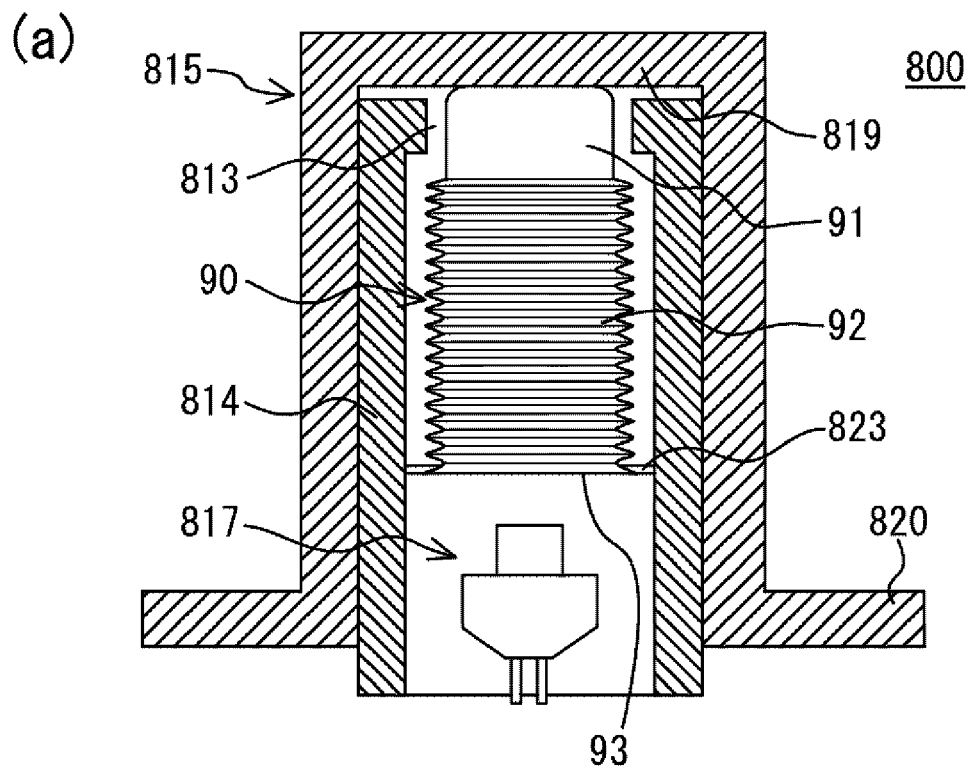
FIGS. 10(a) and 10(b) are simplified sectional views showing an ejection device according to a modification of the present invention.
Figure 10:
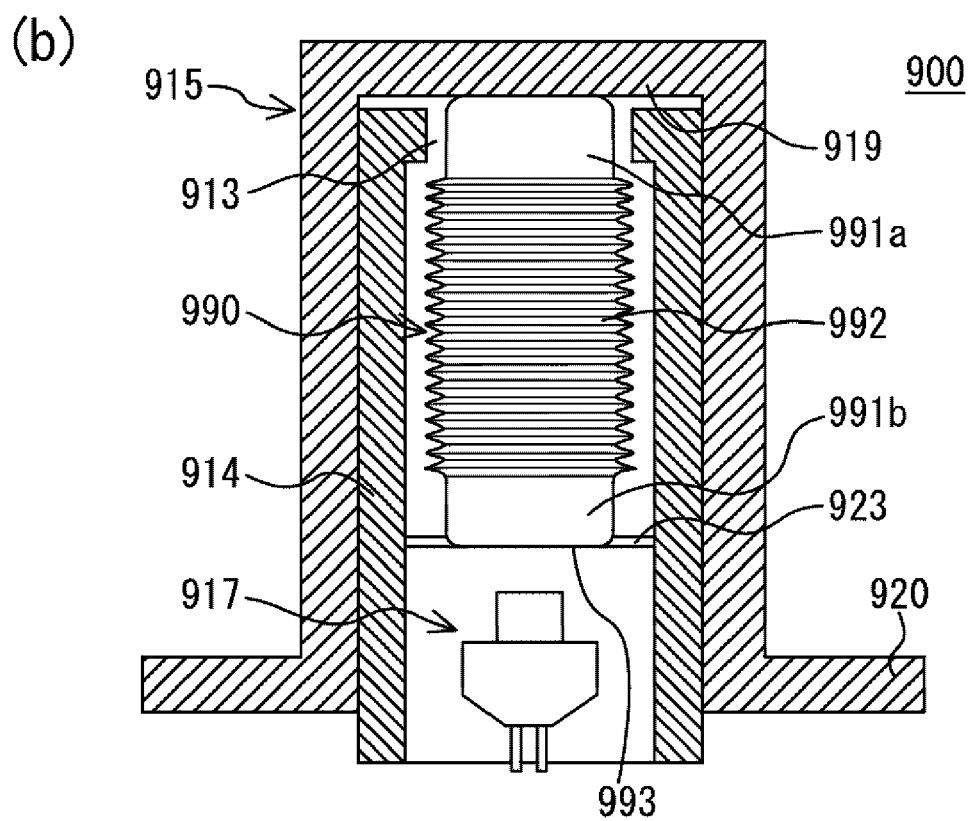

As shown in FIG. 10(*a*) (the same components as in the first embodiment are not shown), in an ejection device 800 according to the present modification, a hollow bellows member 90 is provided in a cylinder 814. The bellows member 90 has a cylindrical portion 91 connected to a bottomed cylindrical portion 819 of a push-up member 815 through a hole portion 813 of the cylinder 814 and a bellows-shaped portion 92 which is connected to the cylindrical portion 91 and can expand and contract without interfering with an inner surface of the cylinder 814. An upper end of the cylindrical portion 91 is fixed so as to come into contact with an inner surface of an upper end of the bottomed cylindrical portion 819 to be in a closed state. An opening end 93 provided at a lower end of the bellows-shaped portion 92 is disposed at a position facing a gas generator 817, and is fixed by a stopper 823 provided in the cylinder 814. In the bellows member 90, the bellows-shaped portion 92 in a folded state is accommodated in the cylinder 814, and gas generated by operation of the gas generator 817 is supplied from the opening end 93 of the bellows-shaped portion 92 to an inner space of the bellows member 90.

In such a configuration, when gas is generated by the operation of the gas generator 817, the gas flows into the inner space of the bellows member 90 through the opening end 93 of the bellows-shaped portion 92, and the bellows-shaped portion 92 expands, so that the cylindrical portion 91 and the bellows-shaped portion 92 partially project to the outside of the cylinder 814, and the push-up member 815 is pushed upward. As a result, the ejected object supported by the support portion 820 of the push-up member 815 can be stably ejected in the ejection direction. Therefore, with the ejection device 800 having such a configuration, as in the first embodiment, it is possible to achieve the weight reduction without reducing the ejection speed of the ejected object.

In the above modification, one end of the bellows member on the push-up member side, that is, the upper end of the cylindrical portion 91 comes into contact with the inner surface of the upper end of the bottomed cylindrical portion 819 to be in the closed state. However, the present invention is not limited to this configuration, and, for example, the cylindrical portion may have a bottom provided so that its upper end is abutted against the inner surface of the upper end of the bottomed cylindrical portion of the push-up member (bottomed cylindrical member).

The shape of the bellows member is not particularly limited. For example, as shown in FIG. 10(b), cylindrical portions 991a and 991b may be provided at both ends of a bellows member 990. In this case, the cylindrical portion 991b facing a gas generator 917 is fixed by a stopper 923 provided in a cylinder 914, and gas generated from an opening end of the cylindrical portion 991b by operation of the gas generator 917 is supplied to an inner space of the bellows member 990. The ejection device 900 having such a configuration can also achieve the same operational effects as the above modification.

In each of the above embodiments, when a parachute or a paraglider is adopted as the ejected object, the parachute or the paraglider may be packed. The packing is configured to break or peel during operation.

In each of the above embodiments, the parachute or paraglider is exemplified as the ejected object. However, the ejected object is not limited thereto, and one including a lift force generating member may be ejected as the ejected object. Examples of the lift force generating member include a parafoil, a rogallo parachute, a single surface parachute, an airplane wing, a propeller, and a balloon. When the lift force generating member has a control line, it is desirable that the ejection device be provided with a steering mechanism which can, for example, change an inclination angle of the ejected lift force generating member using the control line. This steering mechanism includes, for example, a plurality of reels which respectively wind a plurality of control lines connected to a lift force generating member, and a motor which serves as the power for these reels. The control line is wound or fed by driving of the motor, so that the lift force generating member can be appropriately pulled, or the pulling force can be loosened.

Here, for example, (1) nylon 6, nylon 66, nylon 12, nylon 46, nylon 56, nylon 610, copolymerized polyamide of nylon 6 and nylon 66, (2) copolymerized polyamide resulting from copolymerization of polyalkylene glycol, dicarboxylic acid, and amine with nylon 6, (3) a polyester-based resin such as polyethylene terephthalate, polybutylene terephthalate, or polytrimethylene terephthalate, (4) a polyacrylic resin, or a polyolefin-based resin such as polypropylene can be used for a base fabric of the ejected object. Among these, polyamide 66 excellent in resistance against impact and heat can particularly suitably be used for a base fabric of the ejected object.

For example, various resins such as a silicone-based resin, a polyurethane-based resin, a polyacrylic resin, a polyamide-based resin, a polyester-based resin, a polyolefin-based resin, or a fluorine-based resin and various types of rubber such as silicone-based rubber, chloroprene-based rubber, or chlorosulfonated polyethylene-based rubber can be used for a coating layer provided to the base fabric of the ejected object for providing heat resistance, and the silicone-based resin is particularly preferably used. By using the silicone-based resin, not only heat resistance but also cold resistance, flame retardancy, and an air isolation performance can be enhanced. A dimethyl silicone resin, a methyl vinyl silicone resin, a methyl phenyl silicone resin, or a fluorosilicone resin is available as such a silicone-based resin. The coating layer preferably further contains a flame retardant compound. Examples of such a flame retardant compound include a halogen compound containing bromine or chlorine (in particular, halogenated cycloalkane), a platinum compound, antimony oxide, copper oxide, titanium oxide, a phosphorus compound, a thiourea-based compound, carbon, cerium, and silicon oxide, and in particular, a halogen compound, a platinum compound, copper oxide, titanium oxide, or carbon is more preferably used. An appropriate coating layer is preferably selected in accordance with a material for a yarn for making a base fabric, and a material securely in intimate contact with warps and wefts is preferred. For example, when yarns are polyamide yarns or polyester yarns, the coating layer is preferably composed of a polyurethane-based resin or a polyacrylic resin.

Although the vent hole 24 is provided in the bottom of the container 18 in the first embodiment and the vent hole 424 is provided in the side portion of the container 418 in the third embodiment, the present invention is not limited to this position. Any position may be used as long as it is possible to suppress the negative pressure generated between the containers 18 and 418 and the push-up members 15 and 415 during operation.

In each of the above embodiments, the cylinder, the power source, and the container are preferably fixed to the airframe by means such as a rubber band, a belt, a cord, and other means (mechanical joining, bolts, fasteners, adhesives).

Figure 11:
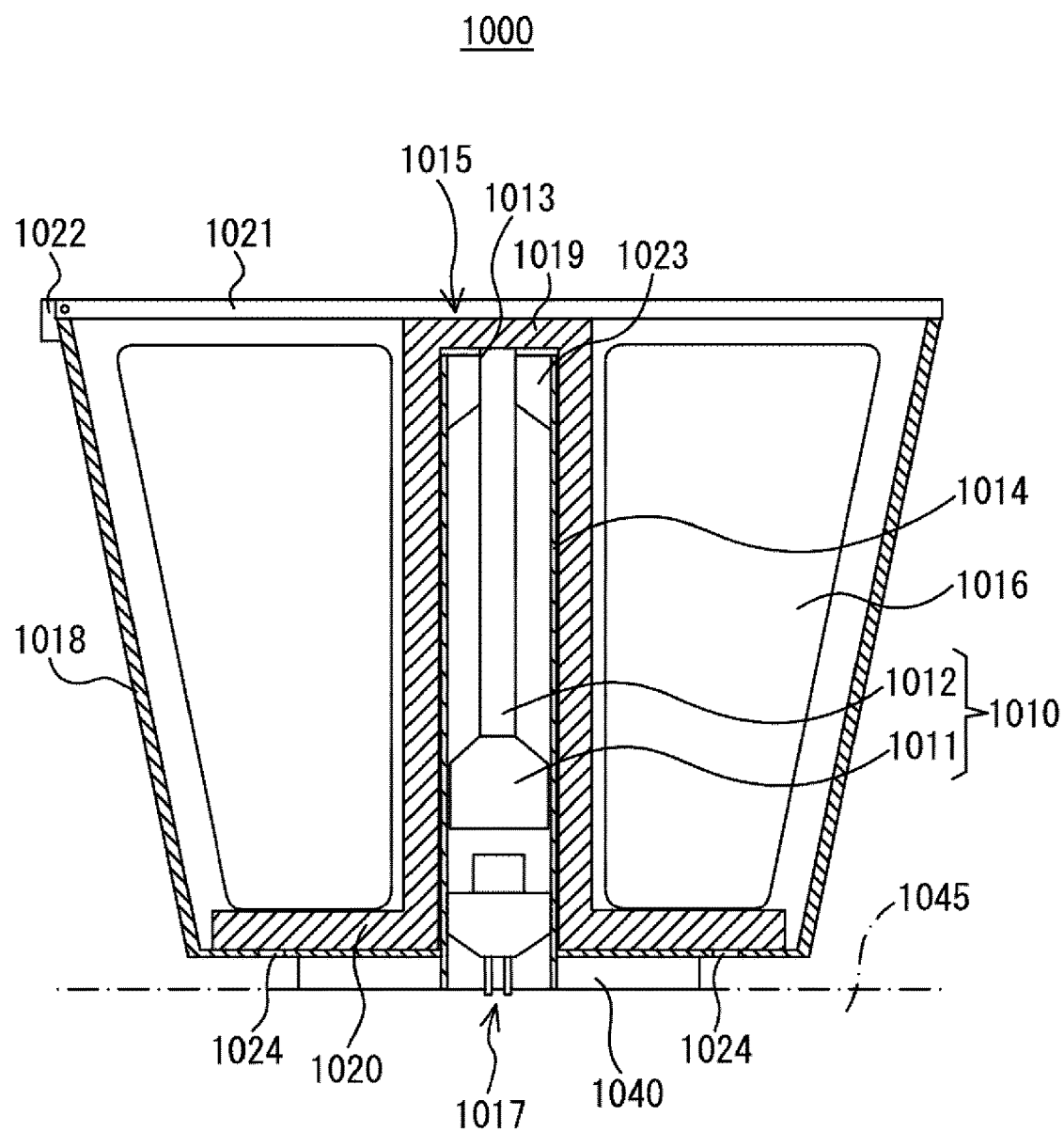
FIG. 11 is a cross-sectional view showing an ejection device according to a modification of the first embodiment.

In the first embodiment, a container having a shape such that a truncated cone is turned upside down may be adopted. Hereinafter, an ejection device according to a modification of the first embodiment will be described with reference to the FIG. 11. In FIG. 11, components with the same last two digits as those in the first embodiment are the same as those described in the first embodiment unless otherwise described, and therefore the description thereof is omitted.

For example, the ejection device 100 of FIG. 1 may be modified like an ejection device 1000 of FIG. 11. Specifically, as shown in FIG. 11, in the ejection device 1000, a container 1018 is formed in a bottomed cylindrical shape whose diameter gradually decreases from an upper end to a lower end. An inner surface of the container 1018 is formed so as not to come into contact with an outer peripheral portion of a support portion 1020, and before operation of a gas generator 1017, a bottom of the support portion 1020 is abutted against an inner surface side of a bottom of the container 1018. The container 1018 is connected and fixed to an airframe 1045 of the flying object via a connecting member 1040 so as not to close a vent hole 1024 provided at the bottom.

An ejected object 1016 is accommodated in the container 1018 between the inner surface of the container 1018 and an outside surface of a bottomed cylindrical portion 1019 of a push-up member 1015 so as to surround the outside surface of the bottomed cylindrical portion 1019, for example. The ejected object 1016 is folded such that the outside of the ejected object 1016 does not come into contact with the inside of the container 1018. The ejected object 1016 may be folded and accommodated such that the outside of the ejected object 1016 comes into contact with the inside of the container 1018.

The ejection device 1000 having such a configuration can also provide the same operational effects as the first embodiment, and the ejected object 1016 can be ejected more smoothly than in the first embodiment.

In the second embodiment, the support portion is provided with the plurality of projecting portions projecting toward the container. However, the plurality of projecting portions may be provided so as to project toward the cylinder. Hereinafter, an ejection device according to a modification of the second embodiment will be described with reference to the FIGS. 12(a) to 12(c). In FIGS. 12(a) to (c), components with the same last two digits as those in the second embodiment are the same as those described in the second embodiment unless otherwise described, and therefore the description thereof is omitted.

Figure 4:
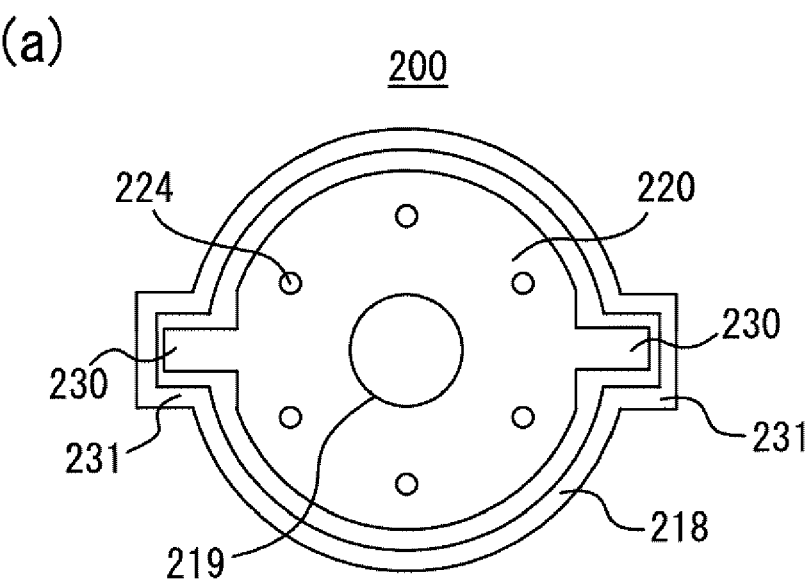
FIG. 4(a) is a plan view showing a partial configuration of an ejection device according to a second embodiment.
FIG. 4(b) is a plan view showing a partial configuration of a modification of the ejection device of FIG. 4(a).
Figure 4:
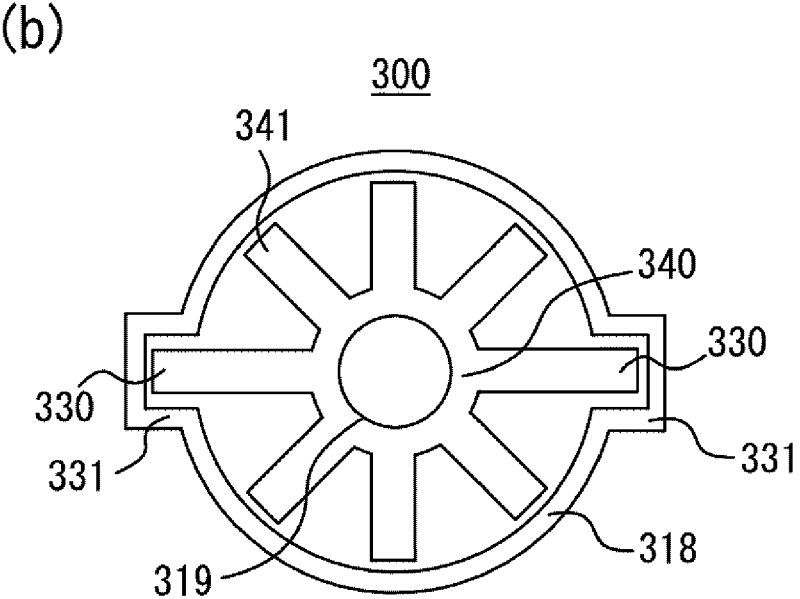
Figure 12:
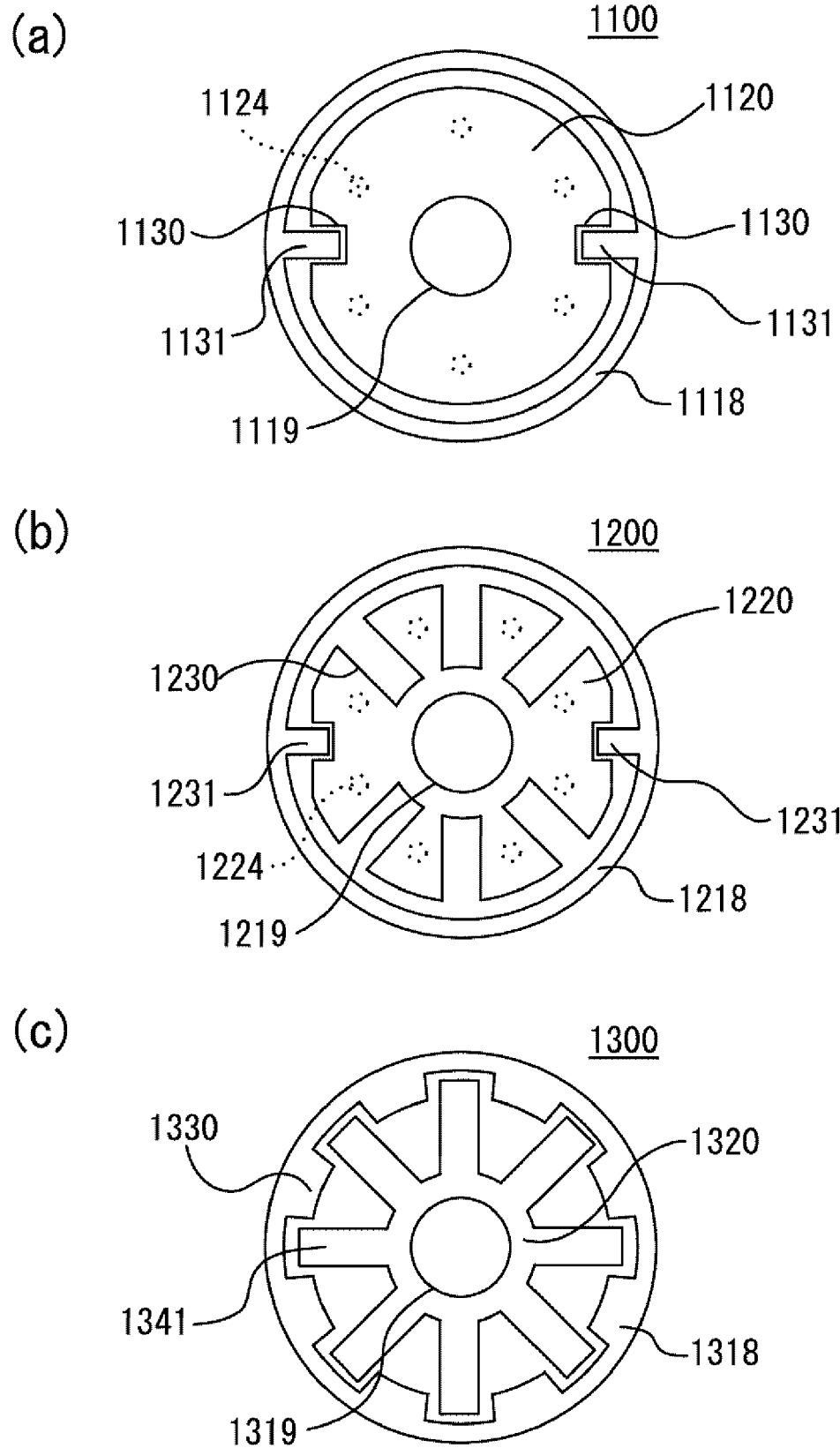
FIGS. 12(a) to (c) are plan views showing a partial configuration of an ejection device according to a modification of the second embodiment.

For example, the ejection device 200 of FIG. 4(*a*) may be modified like an ejection device 1100 of FIG. 12(*a*). Specifically, as shown in FIG. 12(*a*), a substantially circular support portion 1120 of the ejection device 1100 has a pair of recesses 1130 symmetrically arranged with respect to a center of the support portion 1120 (center of a bottomed cylindrical portion 1119). A guide 1131 for guiding the recess 1130 is loosely inserted in a position of a container 1118 corresponding to a portion where each of the recesses 1130 is provided. Each of the guides 1131 is a protruding member whose radial projection length is adjusted so that a sufficient space (space for accommodating the ejected object) between an inner surface of the container 1118 and an outside surface of the bottomed cylindrical portion 1119 is ensured and that the ejected object is not caught by the guide 1131 during ejection. Even with the ejection device 1100 having such a configuration, as in the second embodiment, the support portion 1120 can be pushed up stably, so that the ejected object can be stably ejected in the ejection direction.

As a modification of the ejection device 1100 of FIG. 12(*a*), as shown in FIG. 12(*b*), a plurality of recesses 1230 radially arranged with a center of the support portion 1220 set as a reference may be provided. The ejection device 1200 having such a configuration can also provide the same operational effects as the above modification, and it is possible to further reduce the weight of the support portion 1220 as compared to the above modification, which can further contribute to improvement of the ejection speed.

The ejection device 300 of FIG. 4(*b*) may be modified like an ejection device 1300 of FIG. 12(*c*). Specifically, as shown in FIG. 12(*c*), in the ejection device 1300, the support portion 1320 is provided with a plurality of linear portions 1341 radially arranged with a center of the support portion 1320 set as a reference. An inner wall surface of the container 1318 is provided with a plurality of projecting portions 1330 projecting toward the center of the support portion 1320, and each of the projecting portions 1330 is disposed between tips of the adjacent linear portions 1341. Each of the projecting portions 1330 performs a guide function for guiding propulsion of the support portion 1320 and the linear portion 1341 in the container 1318. In each of the projecting portions 1330, a radial projection length is adjusted so that a sufficient space (space for accommodating the ejected object) between an inner surface of the container 1318 and an outside surface of a bottomed cylindrical portion 1319 is ensured and that the ejected object is not caught by the projecting portion 1330 during ejection. With the ejection device 1300 having such a configuration, as in the second embodiment, it is possible to stably eject the ejected object in the ejection direction and achieve the weight reduction without reducing the ejection speed of the ejected object.

In each of the above embodiments, the shape of the support portion for supporting the ejected object may be any of a disc shape (including a circle and an ellipse), a polygon, and a radial shape. When the shape of the support portion is elliptical or polygonal, it is desirable that the inner surface of the container be formed along the outer peripheral portion of the support portion. That is, by configuring the container so as to have a similar shape to the support portion in a plan view, the guides according to the second embodiment and the modification of the second embodiment are unnecessary.

Figure 13:
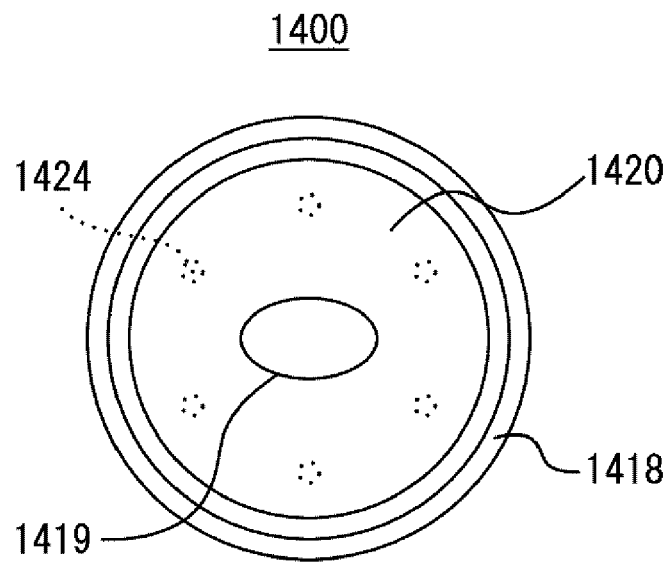
FIGS. 13(a) and (b) are plan views showing a partial configuration of an ejection device according to another modification of the present invention.
Figure 13:
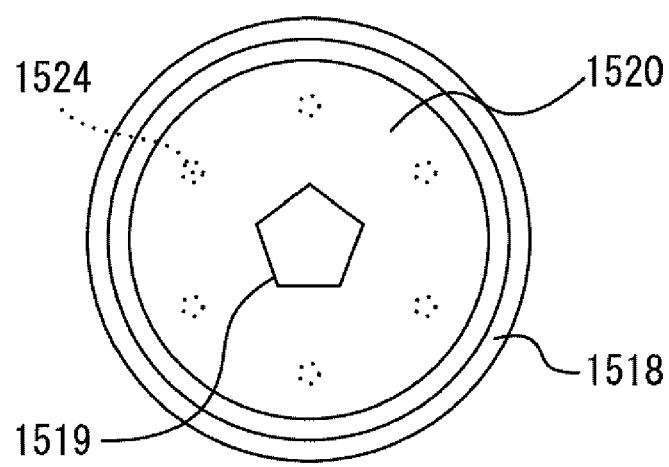

In each of the above embodiments, the bottomed cylindrical portion of the push-up member is formed in a cylindrical shape, but the present invention is not limited to this shape. For example, as shown in FIG. 13(*a*), a bottomed cylindrical portion 1419 may be formed in an elliptic cylindrical shape, or as shown in FIG. 13(*b*), a bottomed cylindrical portion 1519 may be formed in a polygonal cylindrical shape that is a pentagon in plan view. By configuring the cylinders fitted and inserted into the bottomed cylindrical portion 1419 and the bottomed cylindrical portion 1519 respectively so as to have a similar shape to the bottomed cylindrical portions 1419 and 1519, without providing the plurality of projecting portions or guide members as shown in FIG. 12 in the support portions 1420 and 1520, the push-up member can be easily positioned in the containers 1418 and 1518, and the support portions 1420 and 1520 can be stably pushed up. Therefore, according to the ejection devices 1400 and 1500, it is possible to stably eject the ejected object in the ejection direction and achieve the weight reduction without reducing the ejection speed of the ejected object. In FIGS. 13(*a*) and (*b*), components with the same last two digits as those in the first embodiment are the same as those described in the first embodiment unless otherwise described, and therefore the description thereof is omitted.

Figure 14:
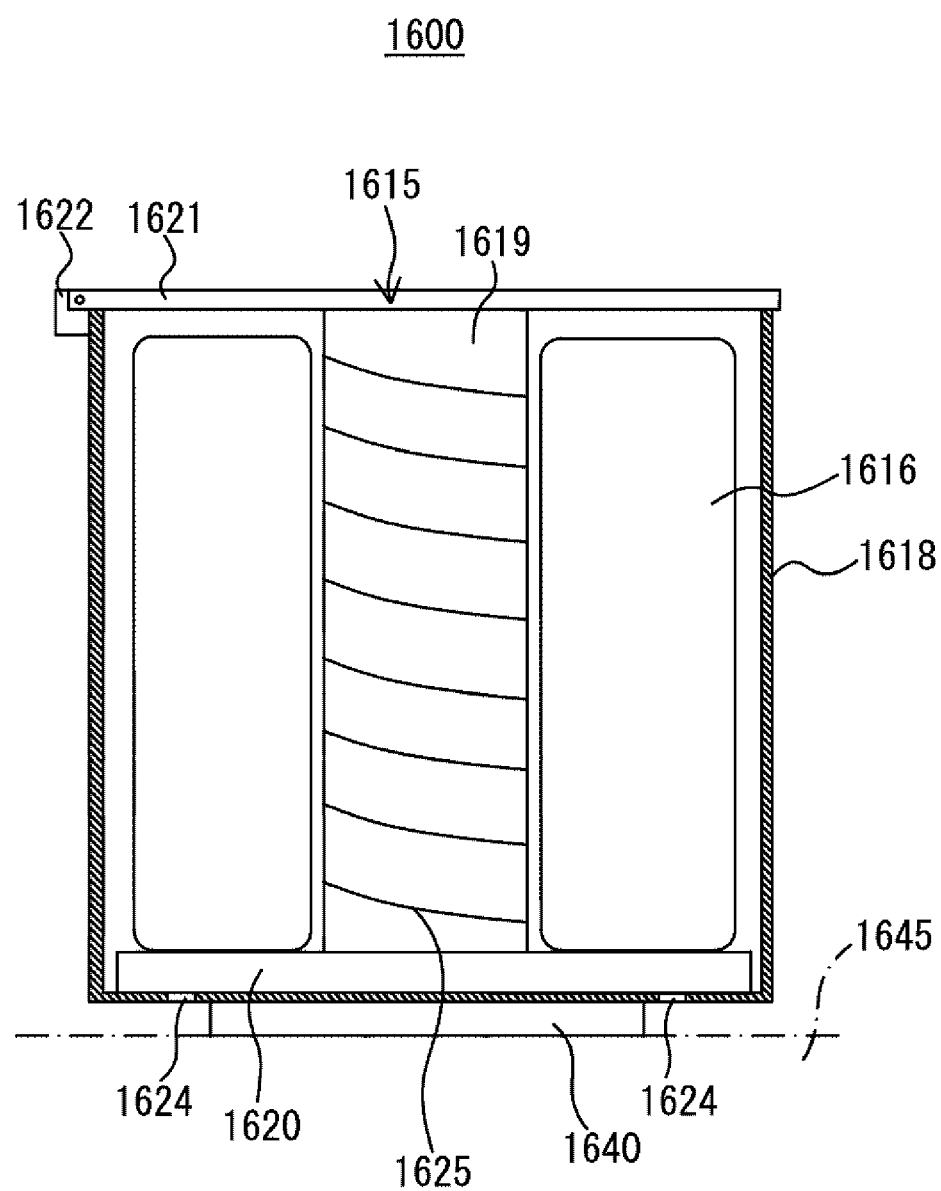
FIG. 14 is a partial cross-sectional view for explaining an installation position of a line in an initial state in the ejection device according to the present invention.

In each of the above embodiments, a line (connecting member) which connects the ejected object such as a parachute or a paraglider to the container or the airframe of the flying object is provided. For example, as shown in FIG. 14, a line (connecting member) 1625 is installed in such a state that one end is connected to an ejected object 1616 and the other end side is spirally wound around a bottomed cylindrical portion 1619 of a push-up member 1615, and the other end is connected to a container 1618, a support portion 1620, or an airframe 1645 of the flying object. The line 1625 installed in such an initial state is easily released from the state of being wound around the bottomed cylindrical portion 1619 when the ejection device 1600 is operated. Therefore, according to the ejection device 1600, it is possible to prevent the line 1625 from being entangled or caught on other components during operation, and it is possible to stably eject the ejected object in the ejection direction. In FIG. 14, components with the same last two digits as those in the first embodiment are the same as those described in the first embodiment unless otherwise described, and therefore the description thereof is omitted.

A modification of the installation position of the line (connecting member) 1625 in the initial state will be described with reference to FIGS. 15(*a*) to 15(*c*). In the following description, for convenience of description, an ejected object, a container, a flying object, and an airframe of the flying object are not illustrated in the drawings.

Figure 15:
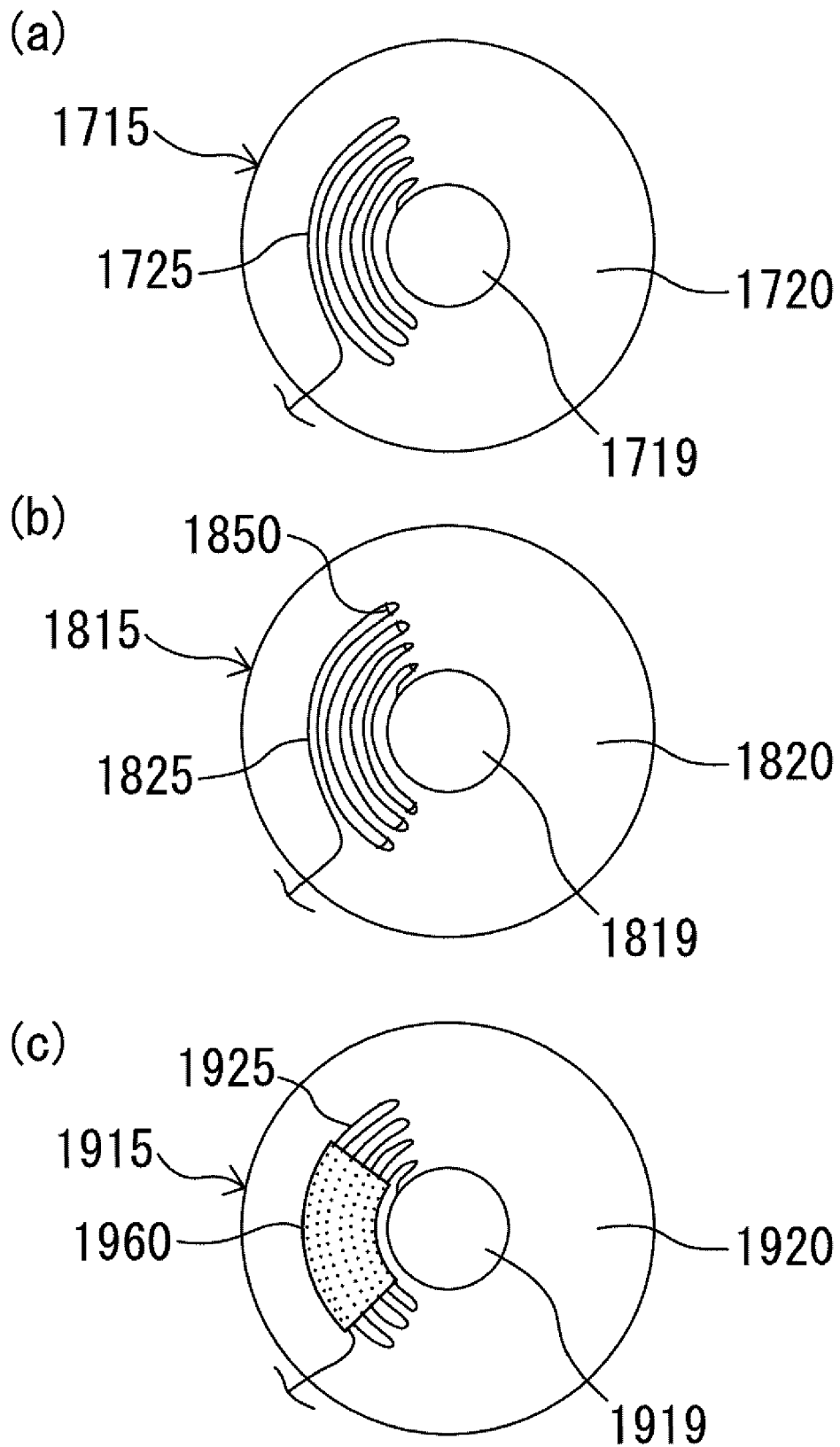
FIG. 15 is a diagram showing a modification of the installation position of the line in the initial state in the ejection device of FIG. 14.

Instead of the line 1625, as shown in FIG. 15(*a*), a line 1725 may be provided to be placed in a meandering manner on an upper surface of a support portion 1720 of a push-up member 1715. Consequently, the line 1725 can be prevented from being entangled or caught on other components during operation. In the line 1725, one end on the center side of the push-up member 1715 is connected to the ejected object, and the other end on the outer edge side of the push-up member 1715 is connected to the container, the support portion 1620, or the airframe of the flying object.

Instead of the line 1625, a line 1825 shown in FIG. 15(*b*) may be used. More specifically, the line 1825 is loosely fixed with a temporary tack band 1850 (for example, a rubber band) at a folded back portion and placed in the same manner as in FIG. 15(*a*). This can prevent the line 1825 from being entangled or caught on other components during operation. In the line 1825, one end on the center side of the push-up member 1815 is connected to the ejected object, and the other end on the outer edge side of the push-up member 1815 is connected to the container, the support portion 1620, or the airframe of the flying object.

Instead of the line 1625, a line 1925 shown in FIG. 15(*c*) may be used. More specifically, the line 1925 is brought into a meandering state and then bundled with a restraining member 1960 such as paper or cloth, resin (film, rubber), or metal wire. As a result, the restraining member 1960 is torn or removed during operation, so that the line 1925 can be prevented from being entangled or caught on other components. In the line 1925, one end on the center side of a push-up member 1915 is connected to the ejected object, and the other end on the outer edge side of the push-up member 1915 is connected to the container, the support portion 1620, or the airframe of the flying object.

Another modification of the installation position of the line (connecting member) 1625 in the initial state will be described with reference to FIGS. 16(*a*) and 16(*b*). In the following description, for convenience of description, an ejected object, a container, a flying object, and an airframe of the flying body are not illustrated in the drawings.

Figure 16:
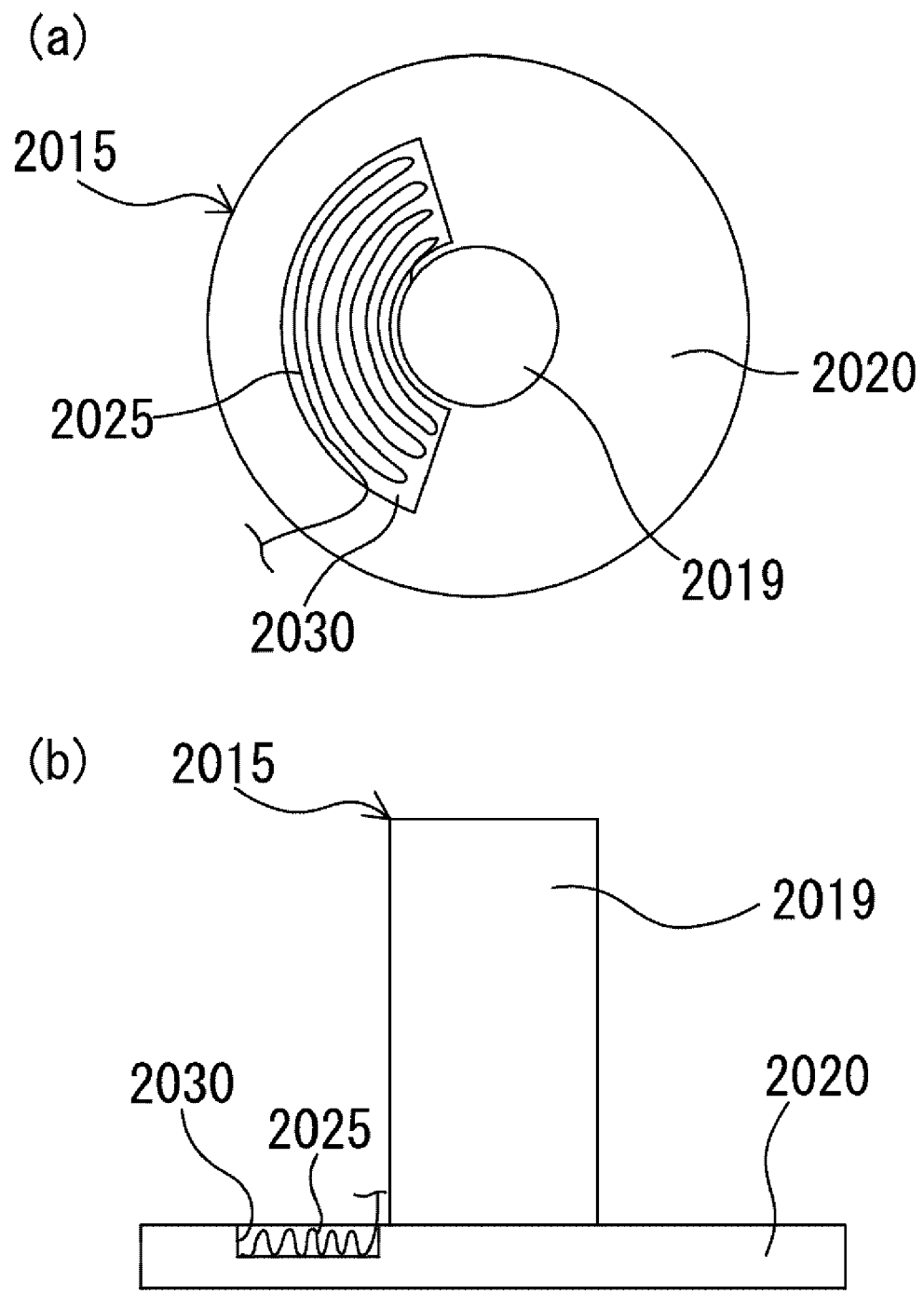
FIG. 16 is a diagram showing another modification of the installation position of the line in the initial state in the ejection device of FIG. 14.

Instead of the line 1625 and the push-up member 1615, a line 2025 and a push-up member 2015 shown in FIGS. 16(*a*) and 16(*b*) may be used. More specifically, the push-up member 2015 has a recess 2030 formed on an upper surface side of a support portion 2020. The line 2025 is placed in a meandering state inside the recess 2030. This can prevent the line 2025 from being entangled or caught on other components as compared to the modification shown in FIG. 15. In the line 2025, one end on the center side of the push-up member 2015 is connected to the ejected object, and the other end on the outer edge side of the push-up member 2015 is connected to the container, the support portion 1620, or the airframe of the flying object.

The present modification may be combined with the modifications shown in FIGS. 15(*b*) and 15(*c*).

Hereinafter, a modification of fixing the ejection device according to the present invention and the airframe of the flying object will be described. In the following modification, components with the same last two digits as those in the first embodiment are the same as those described in the first embodiment unless otherwise described, and therefore the description thereof is omitted.

Figure 17:
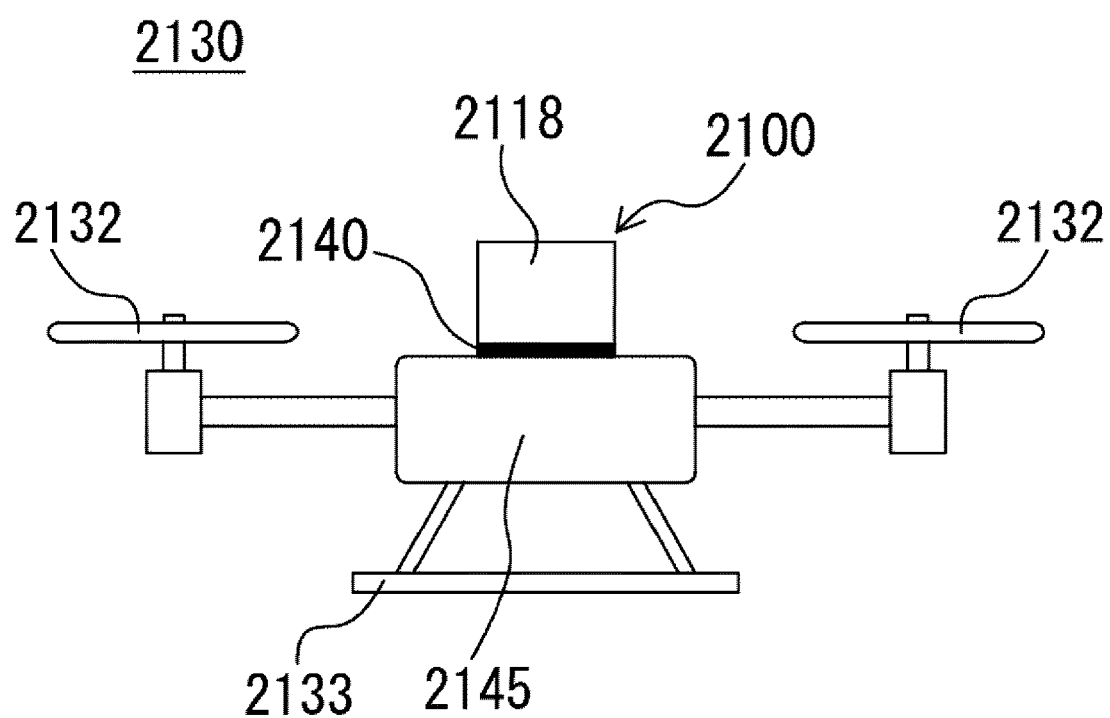
FIG. 17 is a diagram showing a modification of fixing the ejection device according to the present invention and an airframe of the flying object.

As shown in FIG. 17, a container 2118 in an ejection device 2100 of the present modification is fixed to an airframe 2145 of a flying object 2130 with an adhesive. As a result, the container 2118 in the ejection device 2100 can withstand a shock when the ejection device 2100 operates.

Figure 18:
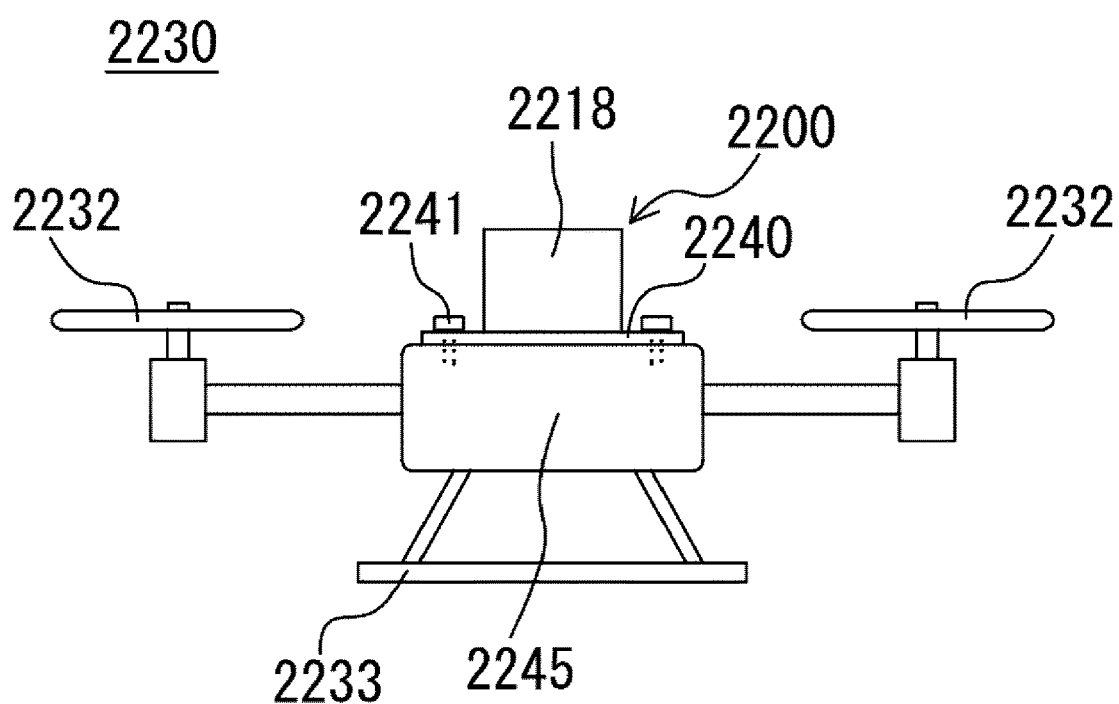
FIG. 18 is a diagram showing another modification of fixing the ejection device according to the present invention and the airframe of the flying object.

Another modification of fixing the ejection device according to the present invention and the airframe of the flying object will be described. As shown in FIG. 18, a plate-like connecting member 2240 is connected and fixed to a bottom of a container 2218 in an ejection device 2200 of the present modification, and the connecting member 2240 is fixed to an airframe 2245 of a flying object 2230 by a bolt 2241. As a result, the container 2218 in the ejection device 2200 can withstand a shock when the ejection device 2200 operates.

Figure 19:
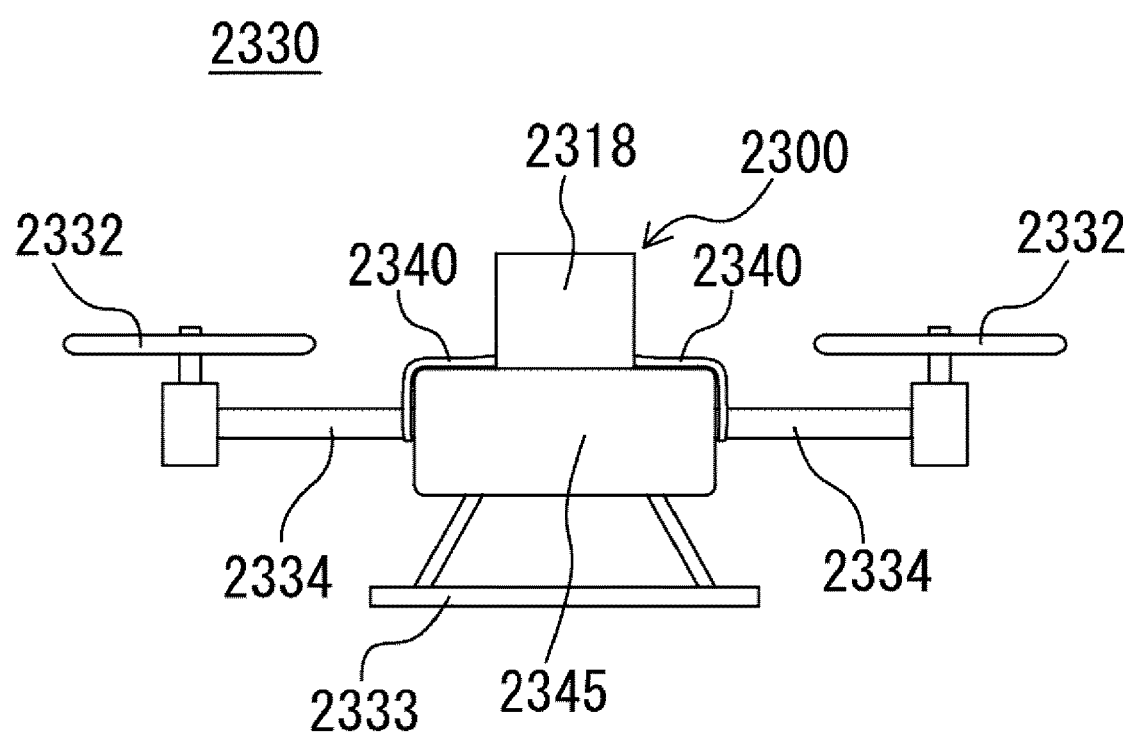
FIG. 19 is a diagram showing another modification of fixing the ejection device according to the present invention and the airframe of the flying object.

Another modification of fixing the ejection device according to the present invention and the airframe of the flying object will be described. As shown in FIG. 19, one ends of a pair of string-like or band-like connecting members 2340 are connected and fixed respectively to side portions of a container 2318 in the ejection device 2300 of the present modification. The other end of each of the pair of connecting members 2340 is connected and fixed to an arm portion 2334 or an airframe 2345 of a flying object 2330 so that a bottom of the container 2318 is in close contact with an upper portion of the airframe 2345 of the flying object 2330. As a result, the container 2318 in the ejection device 2300 is in close contact with the airframe 2345 of the flying object 2330 and thus can withstand a shock when the ejection device 2300 operates. The string-like or band-like connecting members 2340 of the number corresponding to the number of the arm portions 2334 of the airframe 2345 may be coupled, or only several connecting members 2340 may be coupled.

Figure 20:
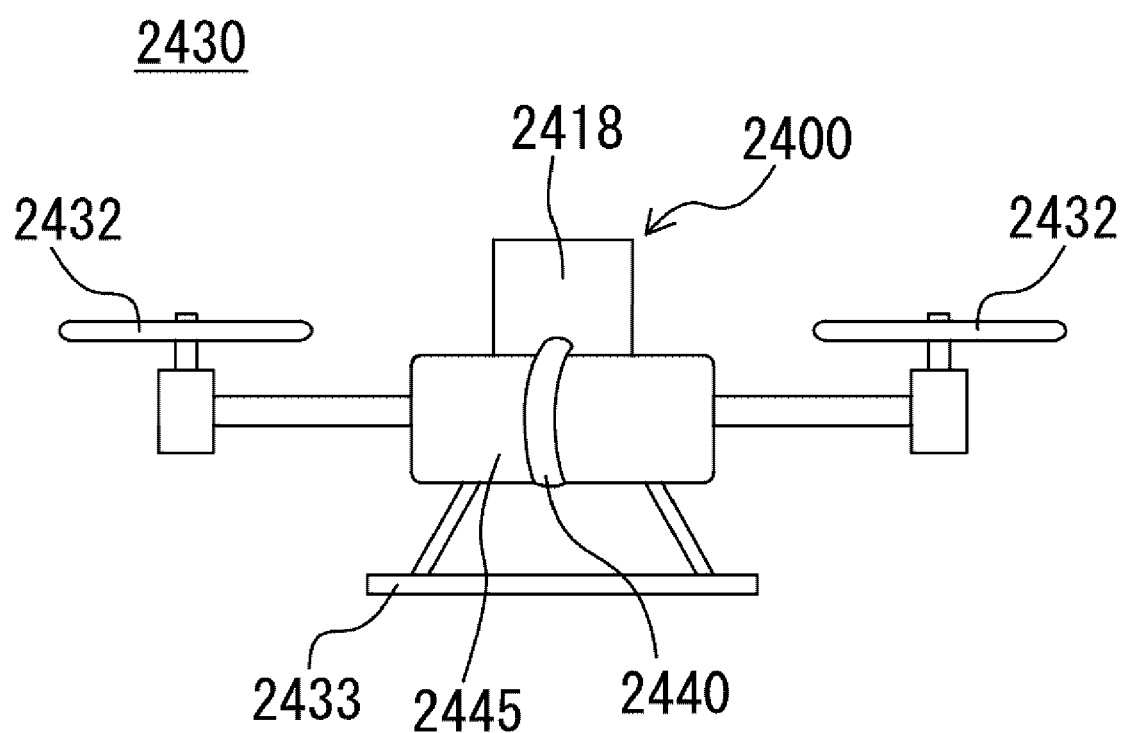
FIG. 20 is a diagram showing another modification of fixing the ejection device according to the present invention and the airframe of the flying object.

Another modification of fixing the ejection device according to the present invention and the airframe of the flying object will be described. As shown in FIG. 20, one ends of a pair of string-like or band-like connecting members 2440 are connected and fixed respectively to side portions of a container 2418 in an ejection device 2400 of the present modification. The other end of each of the pair of connecting members 2440 is connected and fixed to an airframe 2445 of a flying object 2430 so that a bottom of the container 2418 is in close contact with an upper portion of the airframe 2445 of the flying object 2430. As a result, the container 2418 in the ejection device 2400 is in close contact with the airframe 2445 of the flying object 2430 and thus can withstand a shock when the ejection device 2400 operates. Several string-like or band-like connecting members 2440 may be connected.

Figure 21:
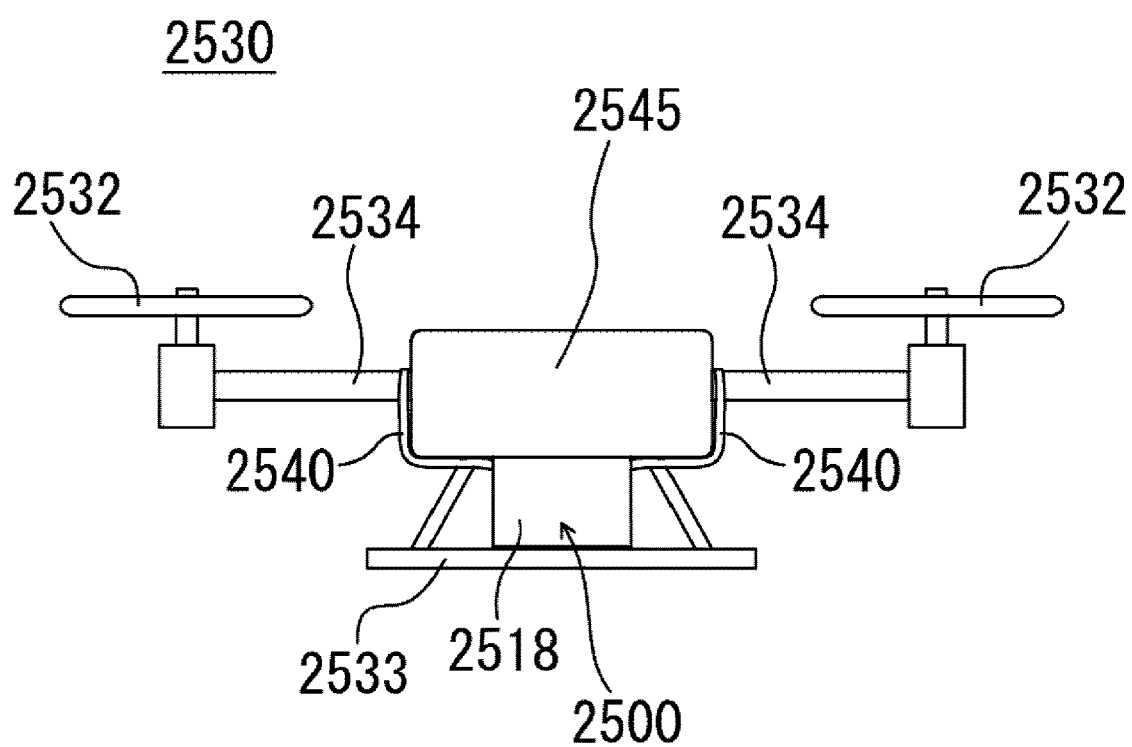
FIG. 21 is a diagram showing another modification of fixing the ejection device according to the present invention and the airframe of the flying object.

Another modification of fixing the ejection device according to the present invention and the airframe of the flying object will be described. As shown in FIG. 21, a container 2518 in an ejection device 2500 of the present modification is attached to a lower portion of a flying object 2530. Specifically, one ends of a pair of string-like or band-like connecting members 2540 are connected and fixed respectively to side portions of the container 2518 in the ejection device 2500 of the present modification. The other end of each of the pair of connecting members 2540 is connected and fixed to an arm portion 2534 or an airframe 2545 of the flying object 2530 so that a bottom (a portion in a direction opposite to the ejection direction of the ejected object) of the container 2518 is in close contact with a bottom of the airframe 2545 of the flying object 2530. As a result, the container 2518 in the ejection device 2500 is in close contact with the airframe 2545 of the flying object 2530 and thus can withstand a shock when the ejection device 2500 operates. The string-like or band-like connecting members 2540 of the number corresponding to the number of the arm portions 2534 of the airframe 2545 may be coupled, or only several connecting members 2340 may be coupled.

Figure 22:
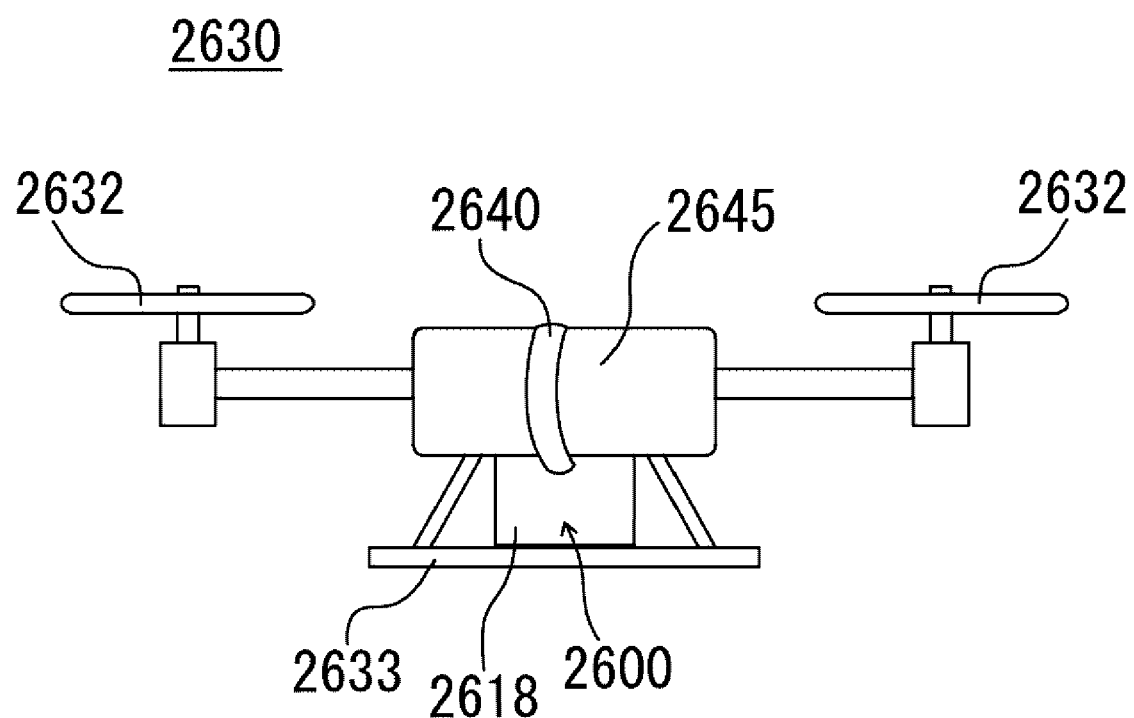
FIG. 22 is a diagram showing a modification of fixing the ejection device according to the present invention and an airframe of the flying object.

Another modification of fixing the ejection device according to the present invention and the airframe of the flying object will be described. As shown in FIG. 22, one ends of a pair of string-like or band-like connecting members 2640 are connected and fixed respectively to side portions of a container 2618 in an ejection device 2600 of the present modification. The other end of each of the pair of connecting members 2640 is connected and fixed to an airframe 2645 of a flying object 2630 so that a bottom (a portion in the direction opposite to the ejection direction of the ejected object) of the container 2618 is in close contact with a bottom of the airframe 2645 of the flying object 2630. As a result, the container 2618 in the ejection device 2600 is in close contact with the airframe 2645 of the flying object 2630 and thus can withstand a shock when the ejection device 2600 operates. Several string-like or band-like connecting members 2640 may be connected.

Hereinafter, a modification of a method of folding an ejected object (for example, a paraglider) accommodated in the container of the ejection device according to the present invention will be described. Here, for convenience of description, the ejected objects in the drawings are schematically illustrated.

Figure 23:
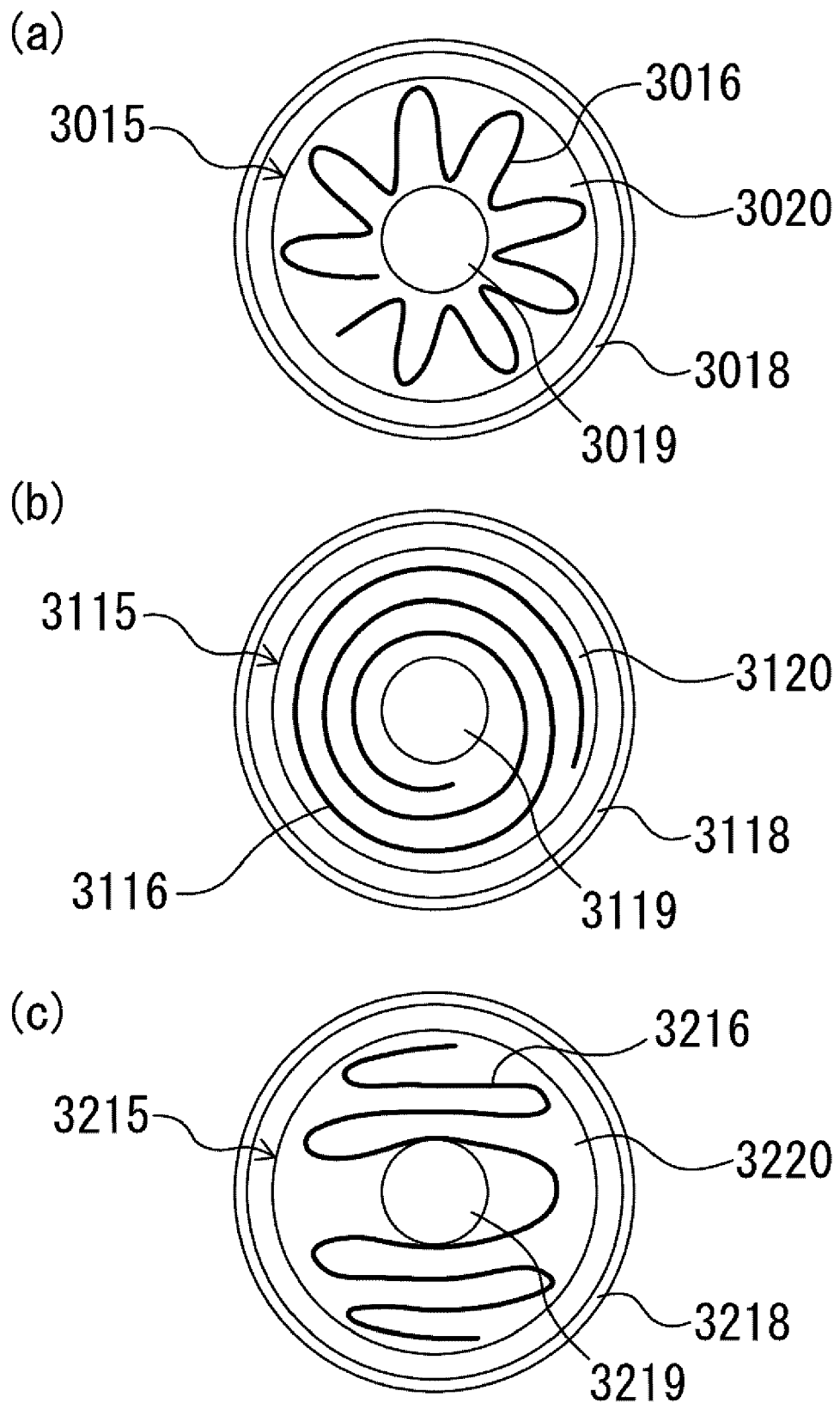
FIG. 23 is a diagram showing a method of folding an ejected object in the ejection device according to the present invention.

First, FIG. 23(a) shows an example in which an ejected object 3016 is installed on a support portion 3020 of a push-up member 3015. The ejected object 3016 is a paraglider in which the ejected object 3016 zigzag-folded such that valleys and peaks are repeated is placed so as to surround a bottomed cylindrical portion 3019 of the push-up member 3015.

Next, FIG. 23(b) shows an example in which an ejected object 3116 is installed on a support portion 3120 of a push-up member 3115. The ejected object 3116 is a paraglider in which the ejected object 3116 is spirally wound around a bottomed cylindrical portion 3119 of the push-up member 3115 and placed so as to surround the bottomed cylindrical portion 3119 of the push-up member 3115.

Subsequently, FIG. 23(c) shows an example in which an ejected object 3216 is installed on a support portion 3220 of a push-up member 3215. The ejected object 3216 is a paraglider zigzag-folded such that valleys and peaks are repeated in a direction along a radial direction of a bottomed cylindrical portion 3219 of the push-up member 3215 and is placed so as to sandwich the bottomed cylindrical portion 3219 on the valley side in the middle.

Each of the ejected objects shown in FIGS. 23(a) to 23(c) may be covered or restrained by a restraining member such as cloth or paper, resin (film, rubber), or metal wire. Here, in the case of the cloth, the resin (film, rubber), the metal wire, or the like, in order that the restraint of the ejected object can be easily released during operation, for example, the ejected object is only loosely fixed so as to be easily released while being covered continuously. In the case of the paper, paper having a strength capable of easily breaking during operation and releasing the restraint of the ejected object is used.

A modification of the ejection device 400 according to the third embodiment shown in FIG. 5 includes an ejection device 2700 (see FIG. 24) having a piston member 3310 similar to the piston member 10 of the ejection device 100 shown in FIG. 1. In the present modification, components with the same last two digits as those in the above third embodiment are the same as those described in the third embodiment unless otherwise described, and therefore the description thereof is omitted. According to the ejection device 2700, the same effects as those of the ejection device 100 shown in FIG. 1 and the ejection device 400 shown in FIG. 5 can be obtained.

Figure 24:
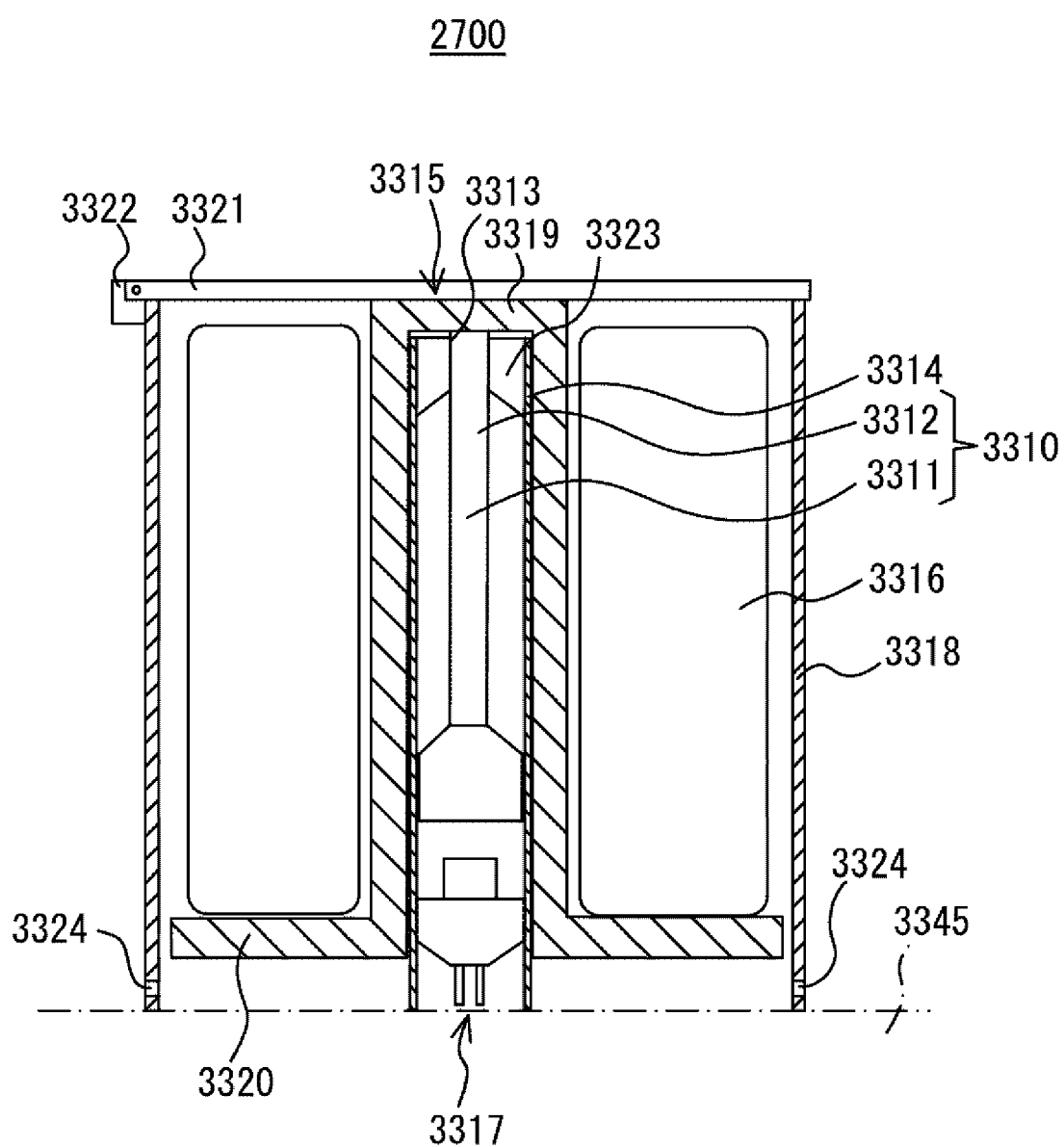
FIG. 24 is a cross-sectional view showing a modification of the ejection device of FIG. 5.

Although the vent hole 424 of FIG. 5 and a vent hole 3324 of FIG. 24 are in an unsealed state (unclosed state), the vent holes may be sealed by applying an aluminum film or the like having a predetermined thickness on the outer or inner side of each vent hole. If such a seal is provided, it is possible to add a function of preventing passage of outside air containing moisture in a normal state, and when an internal pressure has reached a predetermined value or more during operation of the ejection device, the seal breaks, so that the outside air can be introduced. Therefore, when such a seal is provided, it is possible to suppress rust on components inside the ejection device in the normal state before operation, reduce the negative pressure phenomenon during operation, and move the push-up member smoothly.

In the above embodiments and modifications, when the parachute or paraglider is used as the ejected object, the ejected parachute or paraglider is in a state of being connected to the main body portion, the container, or the like via the connecting member. However, the lid of the container may be connected to the connecting member by using another connecting member. Accordingly, after the ejection of the parachute or the paraglider, even if the lid of the container is removed from the container, it is possible to prevent dropping of the lid.

Figure 25:
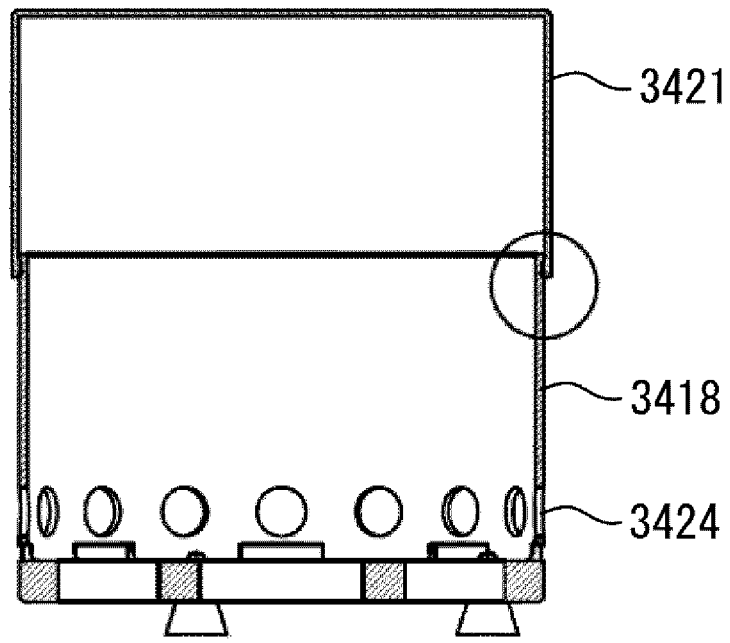
FIG. 25 is a cross-sectional view showing a modification of a container and a lid according to the present invention.
Figure 25:
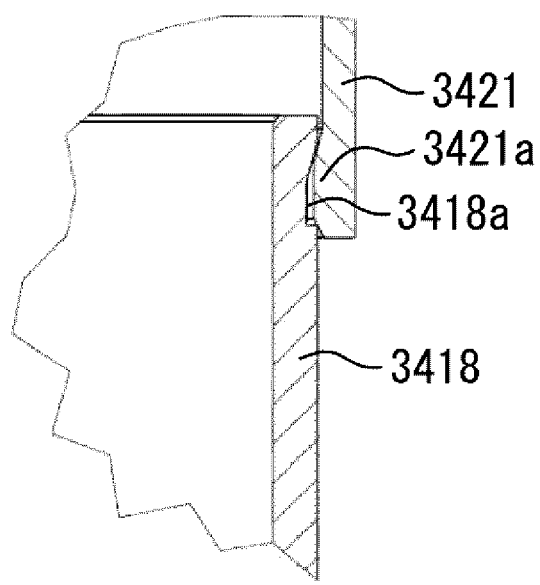

When the lid is fixed to the container in each of the above embodiments and modifications, as shown in FIG. 25(a), a snap-out method of mating a bottomed cylindrical lid 3421 from an outside of an outer diameter of a bottomed cylindrical container 3418 may be used. Specifically, as shown in FIG. 25(b), which is an enlarged view of a circular portion shown in FIG. 25(a), a protrusion 3421a is provided on an inner peripheral portion of an opening of the lid 3421, and a recess 3418a with which the protrusion 3421a meshes is provided on an outer peripheral portion of an opening of the container 3418. With this, not only the container 3418 and the lid 3421 can be mated with each other to easily fix the lid 3421 to the container 3418, but also during operation, a support portion (not shown) pushes up the lid 3421 by the generated force and the protrusion 3421a having meshed with the recess 3418a is removed from the recess 3418a to release the fixing, and thus to remove the lid 3421 from the container 3418, so that an ejected object (not shown) can be ejected. In FIG. 25, for the sake of explanation, components such as an ejection unit inside the container are omitted.

In the above embodiments and modifications, when the parachute or paraglider is used as the ejected object, the ejected parachute or paraglider is in a state of being connected to the main body portion or the container via the connecting member. However, the fixed position of the connecting member is not limited to the main body portion or the container. For example, the ejection device according to each of the above embodiments and modifications may be connected to a component (mount) for fixing to the main body portion via the connecting member.

In the flying object of each of the above embodiments and modifications, a drop detection device which detects a drop of the main body portion may be provided inside or outside the main body portion. When the drop detection device is provided outside, the drop detection device is preferably provided anywhere around the ejection device. Hereinafter, with reference to FIGS. 26 to 30, five specific examples in the case where the drop detection device is provided anywhere around the ejection device will be described. In these five specific examples, components having the same names as those of the flying object of each of the above embodiments and modifications are the same components, and therefore the description thereof may be omitted. Although FIGS. 26 to 30 show an enlarged view of only a periphery of a component that needs to be described (mainly the vicinity of the drop detection device described later), a component that is not particularly shown (component that is not expressed) is omitted because the component is the same as that of the flying object of each of the above embodiments and modifications.

(Installation Position of Drop Detection Device: Specific Example 1)

FIG. 26(a) is a partially enlarged view of a flying object according to a modification in which the flying object is viewed obliquely from above so that the drop detection device can be seen. FIG. 26(b) is a partially enlarged view of the flying object according to a modification in which the flying object is viewed obliquely from above so that an ejection device and a portion of a fixing portion of the ejection device can be seen. FIG. 26(c) is a partially enlarged view of the flying object according to a modification in which the flying object is viewed obliquely from below so that a disk-shaped member can be seen.

Figure 26:
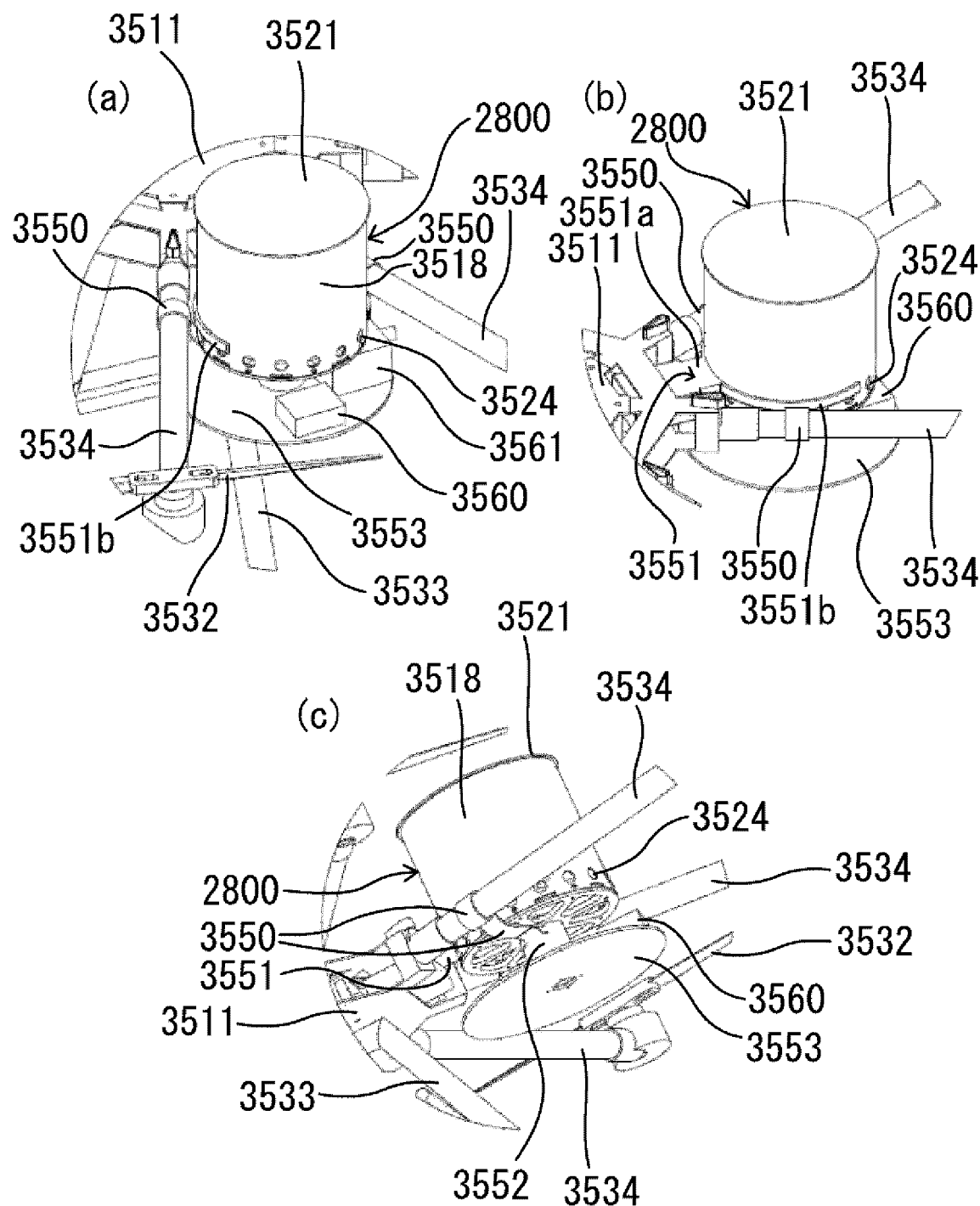
FIG. 26 is a partially enlarged view showing a modification of the flying object according to the present invention.

As shown in FIG. 26, in an ejection device 2800, a lower surface of a container 3518 having a plurality of vent holes 3524 in its side portion is fixed using a pair of belt-shaped fixing tools 3550 so as to be installed between a pair of adjacent arm portions 3534 in the flying object, and a curved surface portion of the side portion of the container 3518 is held by a holding portion 3551. Each of the fixing tools 3550 has one end connected to the arm portion 3534 and the other end connected to a bottom of the container 3518. The holding portion 3551 includes a base portion 3551a fixed to the main body portion 3511 of the flying object and a pair of arm portions 3551b extending from the base portion 3551a. The pair of arm portions 3551b is formed in a shape (substantially C-shape) along a circumferential direction of the curved surface portion of the side portion of the container 3518, and holds the side portion (a portion of a peripheral portion) of the container 3518.

As shown in FIG. 26(c), a cylindrical member 3552 is provided from a central portion of a lower surface of the container 3518 toward the lower portion, and a disk-shaped member 3553 is provided at a tip of the cylindrical member 3552 in a state where a predetermined space is formed between the disk-shaped member 3553 and the lower surface of the container 3518. On an upper surface of the disk-shaped member 3553 (surface on the cylindrical member 3552 side), a drop detection device 3560 capable of detecting a drop and a battery 3561 which is a drive power source of the drop detection device 3560 are provided. When the drop detection device 3560 detects the drop of the flying object, the drop detection device 3560 transmits, to the ejection device 2800, an operation signal which triggers operation of the ejection device 2800.

The drop detection device 3560 has various sensors such as an acceleration sensor, an infrared sensor, and an ultrasonic sensor, and may be capable of performing altitude measurement, collision prediction, etc., in addition to detection of a drop. The same applies to the following specific examples.
(Installation Position of Drop Detection Device: Specific Example 2)

FIG. 27(a) is a partially enlarged view of a flying object according to a modification in which the flying object is viewed obliquely from above so that the drop detection device can be seen. FIG. 27(b) is a partially enlarged view of the flying object according to a modification in which the flying object is viewed obliquely from below so that an ejection device, a fixing portion of the ejection device, and a plate-shaped member can be seen. FIG. 27(c) is a partially enlarged view of the flying object according to a modification in which the flying object is viewed obliquely from above so that the ejection device and a portion of the fixing portion of the ejection device can be seen.

Figure 27:
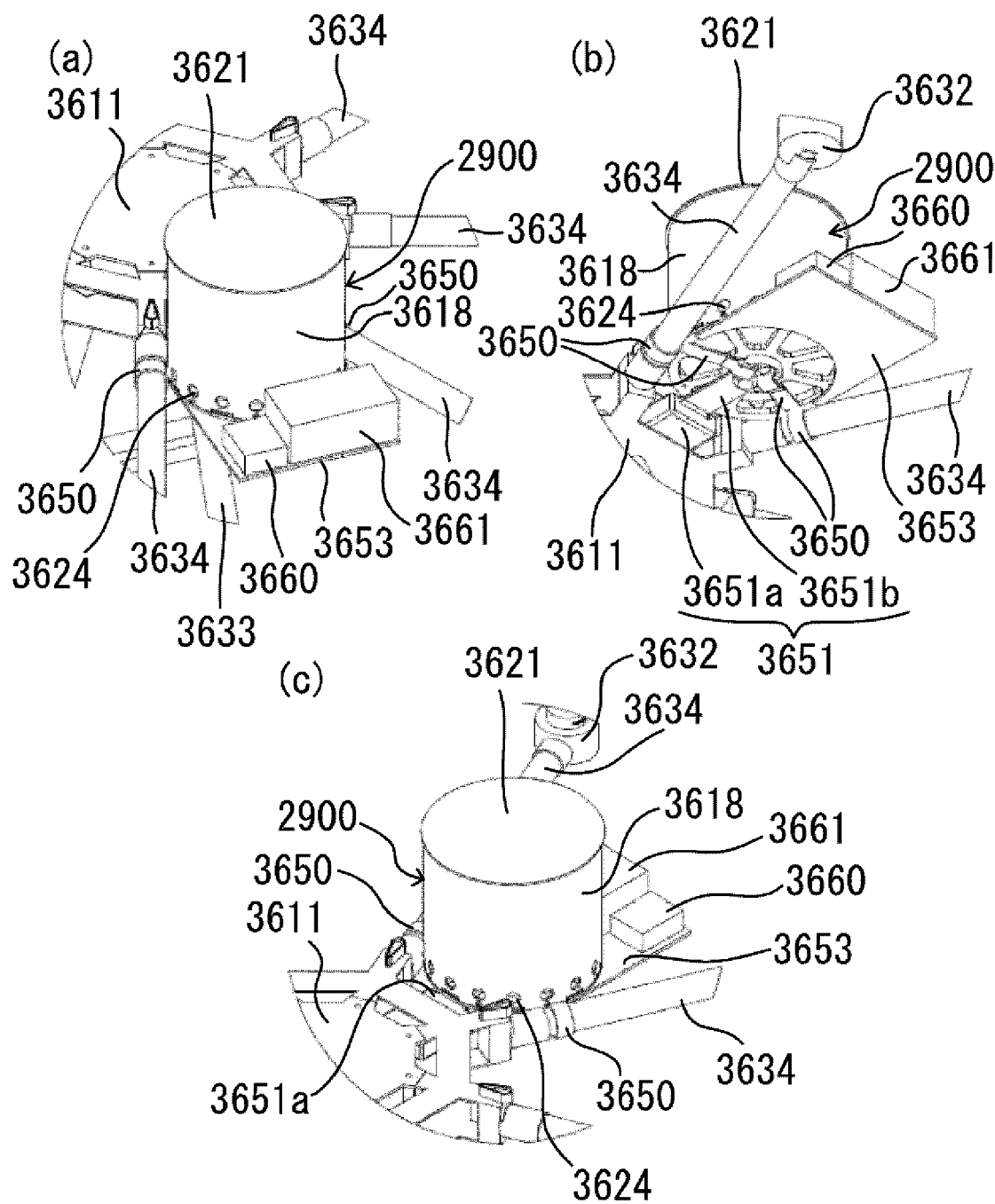
FIG. 27 is a partially enlarged view showing another modification of the flying object according to the present invention.

As shown in FIG. 27, in an ejection device 2900, a lower surface of a container 3618 is fixed using a pair of belt-shaped fixing tools 3650 so as to be installed between a pair of adjacent arm portions 3634 in the flying object, and a curved surface portion of a side portion of the container 3618 is held by a holding portion 3651. Each of the fixing tools 3650 has one end connected to the arm portion 3634 and the other end connected to a bottom of the container 3618. The holding portion 3651 includes a base portion 3651a fixed to a main body portion 3611 of the flying object and an arm portion 3651b extending from the base portion 3651a, and the arm portion 3651b is fixed to the bottom of the container 3618 to support the bottom of the container 3618.

As shown in FIG. 27(b), a plate-shaped member 3653 whose one end side is fixed is provided at an edge of the bottom of the container 3618. The plate-shaped member 3653 is provided between the pair of adjacent arm portions 3634 so as to project outward along a surface of the bottom of the container 3618. On an upper surface of the plate-shaped member 3653, a drop detection device 3660 capable of detecting a drop and a battery 3661 which is a drive power source of the drop detection device 3660 are provided. When the drop detection device 3660 detects the drop of the flying object, the drop detection device 3660 transmits, to the ejection device 2900, an operation signal which triggers operation of the ejection device 2900.
(Installation Position of Drop Detection Device: Specific Example 3)

FIG. 28(a) is a partially enlarged view of a flying object according to a modification in which the flying object is viewed obliquely from above so that the drop detection device can be seen. FIG. 28(b) is a partially enlarged view of the flying object according to a modification in which the flying object is viewed obliquely from below so that an ejection device, a fixing portion of the ejection device, and a plate-shaped member can be seen. FIG. 28(c) is a partially enlarged view of the flying object according to a modification in which the flying object is viewed obliquely from above so that the ejection device and a portion of the fixing portion of the ejection device can be seen.

Figure 28:
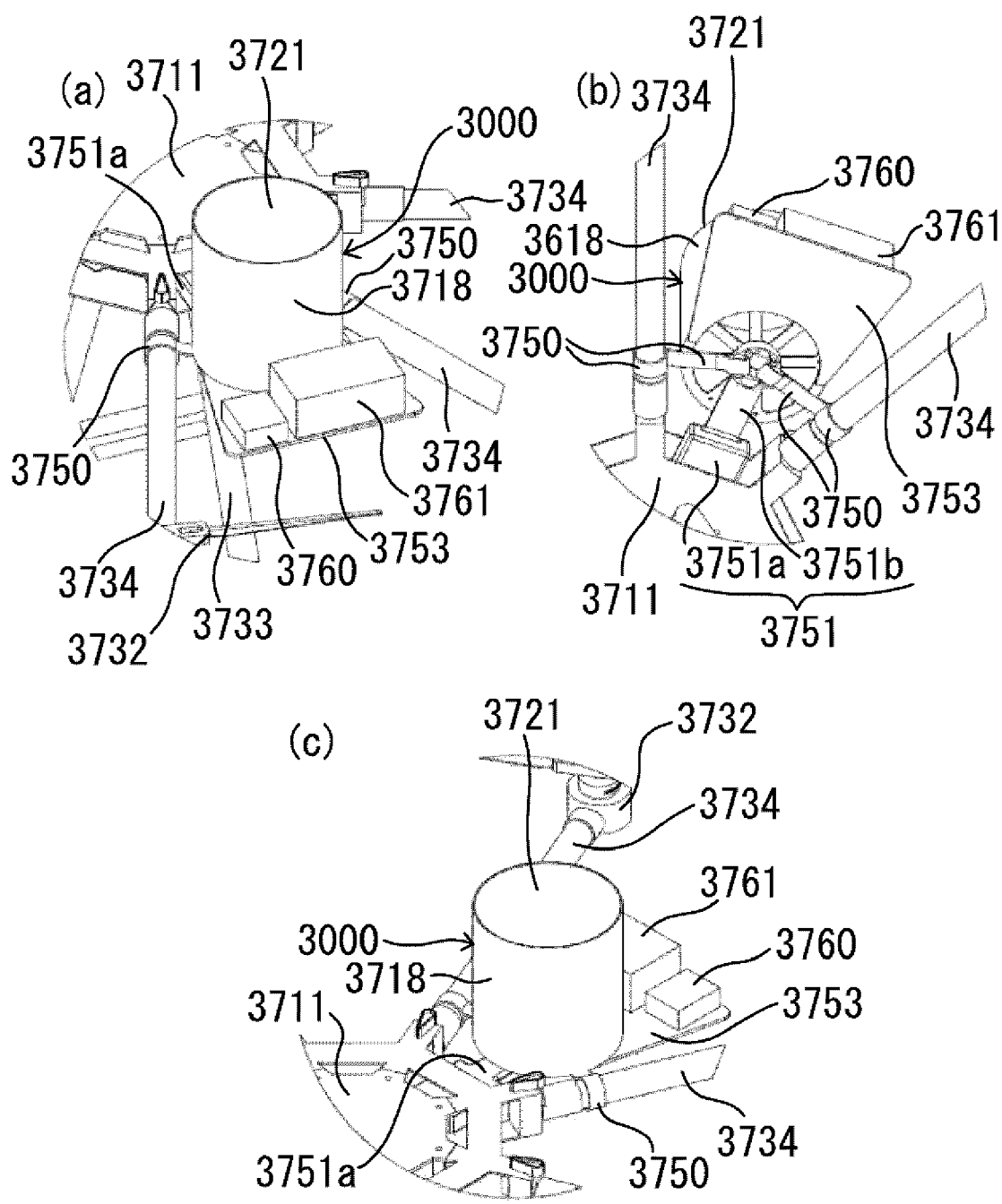
FIG. 28 is a partially enlarged view showing another modification of the flying object according to the present invention.

As shown in FIG. 28, an ejection device 3000 is different from the ejection device 2900 of the specific example 2 in that a container 3718 having no vent hole in its side portion is used instead of the container 3618 of the specific example 2. In FIG. 28, components with the same last two digits as those in FIG. 27 are the same as those in FIG. 27, and therefore the description thereof is omitted.
(Installation Position of Drop Detection Device: Specific Example 4)

FIG. 29(a) is a partially enlarged view of a flying object according to a modification in which the flying object is viewed obliquely from above so that the drop detection device can be seen. FIG. 29(b) is a partially enlarged view of the flying object according to a modification in which the flying object is viewed obliquely from above so that an ejection device and a portion of a fixing portion of the ejection device can be seen. FIG. 29(c) is a partially enlarged view of the flying object according to a modification in which the flying object is viewed obliquely from below so that the ejection device and a portion of the fixing portion of the ejection device can be seen.

Figure 29:
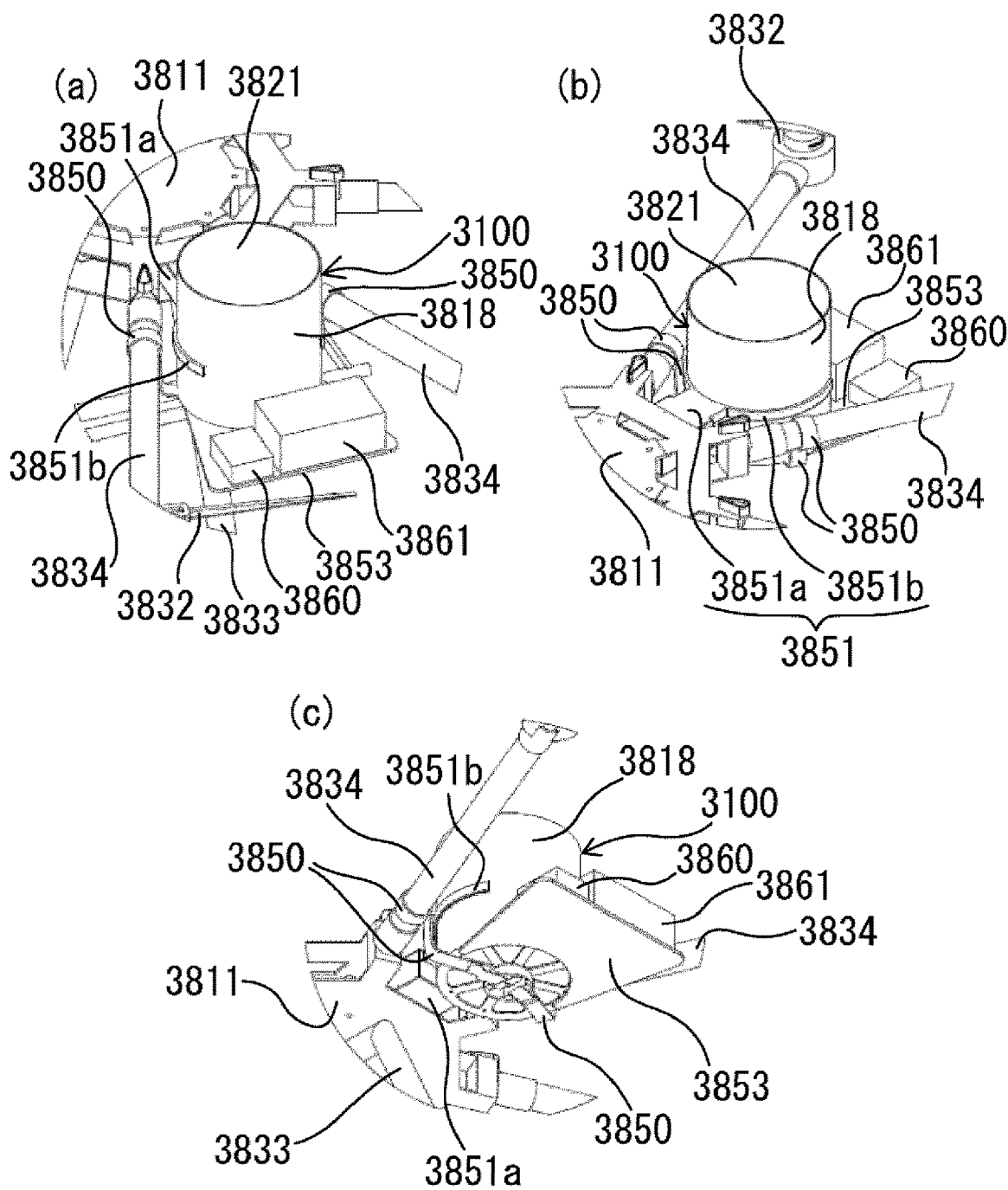
FIG. 29 is a partially enlarged view showing another modification of the flying object according to the present invention.

As shown in FIG. 29, in an ejection device 3100, a lower surface of a container 3818 is fixed using a pair of belt-shaped fixing tools 3850 so as to be installed between the pair of adjacent arm portions 3834 in the flying object, and a curved surface portion of a side portion of the container 3818 is held by a holding portion 3851. Each of the fixing tools 3850 has one end connected to the arm portion 3834 and the other end connected to a bottom of the container 3818. The holding portion 3851 includes a base portion 3851a fixed to the main body portion 3811 of the flying object and a pair of arm portions 3851b extending from the base portion 3851a. The pair of arm portions 3851b is formed in a shape (substantially C-shape) along a circumferential direction of the curved surface portion of the side portion of the container 3818, and holds the side portion (a portion of a peripheral portion) of the container 3818.

As shown in FIG. 29(c), a plate-shaped member 3853 whose one end side is fixed is provided at an edge of the bottom of the container 3818. The plate-shaped member 3853 is provided between the pair of adjacent arm portions 3834 so as to project outward along a surface of the bottom of the container 3818. On an upper surface of the plate-shaped member 3853, a drop detection device 3860 capable of detecting a drop and a battery 3861 which is a drive power source of the drop detection device 3860 are provided. When the drop detection device 3860 detects the drop of the flying object, the drop detection device 3860 transmits, to the ejection device 3100, an operation signal which triggers operation of the ejection device 3100.

(Installation Position of Drop Detection Device: Specific Example 5)

FIG. 30(a) is a partially enlarged view of a flying object according to a modification in which the flying object is viewed obliquely from above so that the drop detection device and a placement portion of the drop detection device can be seen. FIG. 30(b) is a partially enlarged view of the flying object according to a modification in which the flying object is viewed obliquely from above so that an ejection device and a portion of a fixing portion of the ejection device can be seen. FIG. 30(c) is a partially enlarged view of the flying object according to a modification in which the flying object is viewed obliquely from below so that the drop detection device and the placement portion of the drop detection device can be seen.

Figure 30:
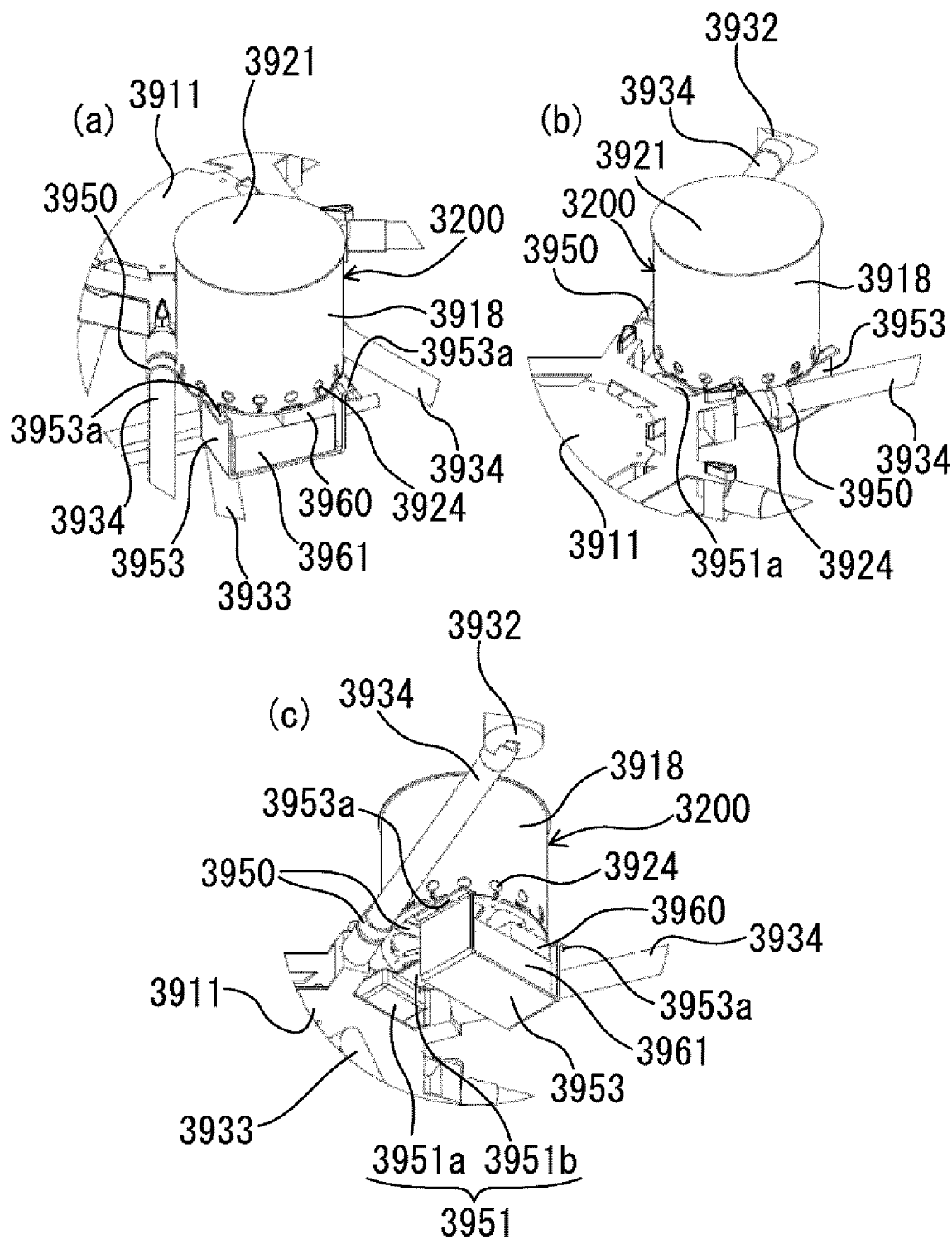
FIG. 30 is a partially enlarged view showing another modification of the flying object according to the present invention.

As shown in FIG. 30, in an ejection device 3200, a lower surface of a container 3918 having a plurality of vent holes 3924 is fixed using a pair of belt-shaped fixing tools 3950 so as to be installed between a pair of adjacent arm portions 3934 in the flying object, and a curved surface portion of a side portion of the container 3918 is held by a holding portion 3951. Each of the fixing tools 3950 has one end connected to the arm portion 3934 and the other end connected to a bottom of the container 3918. The holding portion 3951 includes a base portion 3951a fixed to a main body portion 3611 of the flying object and an arm portion 3951b extending from the base portion 3951a, and the arm portion 3951b is fixed to the bottom of the container 3918 to support the bottom of the container 3918.

As shown in FIGS. 30(a) and 30(c), a placement portion 3953 having a substantially U-shaped cross section is provided at the bottom of the container 3918. More specifically, a flange portion 3953a is provided at a tip end of the placement portion 3953, and the placement portion 3953 is fixed to the bottom of the container 3918 via the flange portion 3953a. On a bottom surface on an inner side of the placement portion 3953, a drop detection device 3960 capable of detecting a drop and a battery 3961 which is a drive power source of the drop detection device 3960 are provided. When the drop detection device 3960 detects the drop of the flying object, the drop detection device 3960 transmits, to the ejection device 3200, an operation signal which triggers operation of the ejection device 3200.

According to the specific examples 1 to 5 of the installation position of the drop detection device, the drop detection device can easily detect the drop of the flying object, and the ejection device can be automatically operated at a suitable timing.

The location of the drop detection device is not limited to the specific examples 1 to 5, and the drop detection device may be provided at any position as long as it is provided at any position of the flying object such as the periphery of the ejection device.

It is preferable that the ejected object in each of the above embodiments and modifications be folded so as to be easily deployed during ejection. The following are specific examples of two folding methods facilitating deployment of a parachute which is an example of an ejected object.

(Method of Folding Parachute: Specific Example 1)

Figure 31:
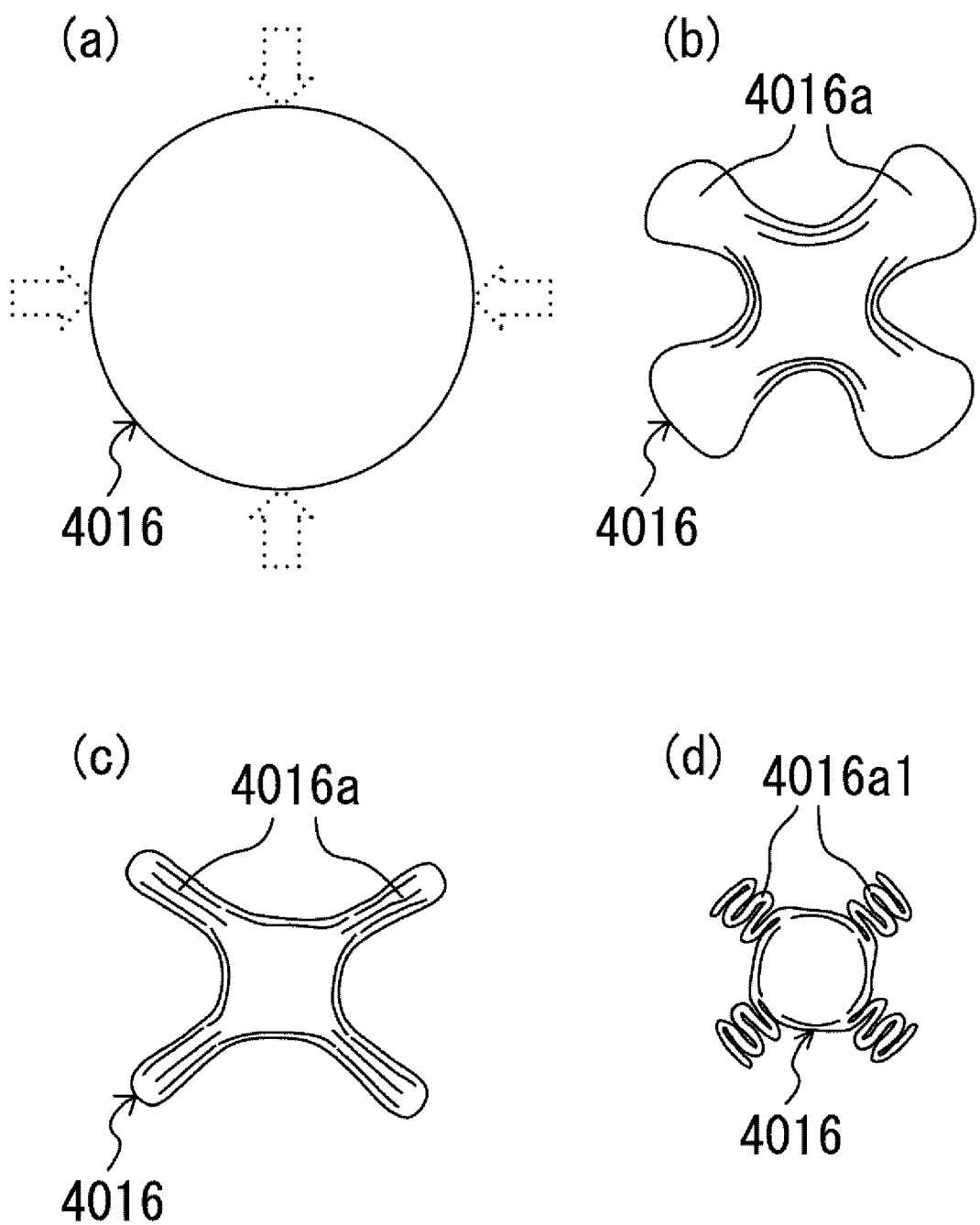
FIG. 31 is a diagram for explaining a method of folding the ejected object stored in the ejection device according to the present invention.

First, as shown in FIG. 31(a) which is a top view of an ejected object 4016 (parachute), force is applied so as to lightly crush the ejected object 4016 (parachute) from four directions shown by white dotted arrows, and four projecting portions 4016a having a projecting shape shown in FIG. 31(b) are formed. Next, a force is applied so as to lightly crush both side portions of the projecting portion 4016a to form the projecting portion 4016a in an elongated shape as shown in FIG. 31(c). Subsequently, as shown in FIG. 31(d), the projecting portion 4016a is folded so as to have a wave shape in which unevenness is repeatedly formed laterally in a horizontal direction, to form a wave-shaped portion 4016a1. Then, the ejected object 4016 is stored in the container of the ejection device.

(Method of Folding Parachute: Specific Example 2)

First, as shown in FIG. 32(a) which is a plan view (view seen from the side) of an ejected object 4116 (parachute), the ejected object 4116 is folded so as to be in the state (bilateral symmetry) of FIG. 32(b) such that the dotted line portion is a mountain portion and the solid line portion between the dotted lines is a valley portion. Lines 4125 are put together every time the ejected object is folded. The schematic cross-sectional view of FIG. 32(b) is a schematic sectional view taken along line B-B of the plan view of FIG. 32(b). Next, the ejected object 4116 is folded so as to have a substantially S-shaped cross-sectional shape on the right side of the drawing from a center of the ejected object 4116 and have a substantially inverted S-shaped cross-sectional shape on the left side of the drawing from the center of the ejected object 4116 (so as to be in the state on FIG. 32(c) (bilateral symmetry)) such that the dotted line portion of the ejected object 4116 is a mountain portion and the dashed-dotted line portion of the ejected object 4116 is a valley portion, in the plan view of FIG. 32(b). Here, the schematic cross-sectional view of FIG. 32(c) is a schematic sectional view taken along line C-C of the plan view of FIG. 32(c). Finally, the ejected object 4116 is folded so as to be in the state shown in FIG. 32(d) such that a center line of the ejected object 4116 in the plan view of FIG. 32(c) is a mountain portion. Here, the schematic cross-sectional view of FIG. 32(d) is a schematic cross-sectional view taken along the line D-D of the plan view of FIG. 32(d). Then, after the lines 4125 are put together, the ejected object 4116 is stored in the container of the ejection device.

(Method of Folding Parachute: Specific Example 3)

First, a parachute, a rubber band, and a container (with a lid) of an ejection device are prepared as equipment to be used. Entanglement of the lines of the parachute is checked, and if the lines are entangled, the lines are untangled. Next, the parachute is spread on a flat surface (floor, etc.) so as to deploy from the center to the outside. After that, ends of all the lines of the parachute are held, and all the lines are pulled so that a connecting portion between each line and a fabric portion (canopy portion) of the parachute is put together. With all the lines put together, a portion of the fabric portion (canopy portion) of the parachute is drawn out from between the lines, and the shape is arranged such that the drawn-out portions form a rectangular shape. Then, on a flat surface (floor, etc.), the drawn-out portions are symmetrically arranged in a state of being overlapped so that the number of times of overlapping is bisymmetric. Subsequently, the fabric portion (canopy portion) of the parachute is arranged so that edges on the connecting portion side (air intake side) lie flush.

Figure 32:
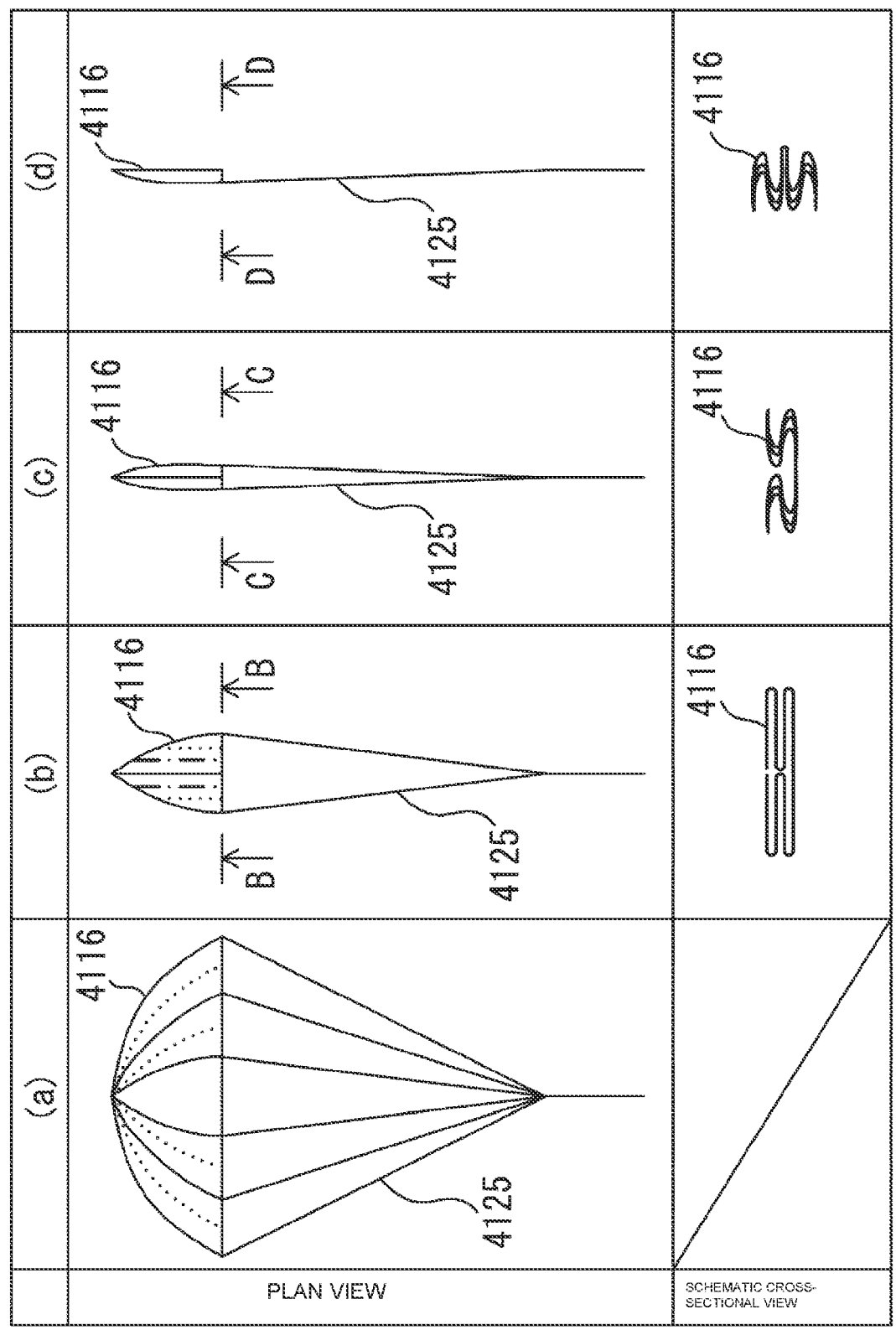
FIG. 32 is a diagram for explaining another method of folding the ejected object stored in the ejection device according to the present invention.

Next, all the lines of the prepared parachute are put together so as to be located almost on the center line of the arranged fabric portion (canopy portion), and in the same manner as in FIG. 32(*c*) described above, the parachute is folded so as to have a substantially S-shaped cross-sectional shape on the right side from a center of the arranged fabric portion (canopy portion) and have a substantially inverted S-shaped cross-sectional shape on the left side from the center of the arranged fabric portion (canopy portion). Furthermore, in the same manner as in FIG. 32(*d*) described above, the parachute is folded such that a center line of the fabric portion (canopy portion) is a mountain portion. Then, the lines put together are folded back at least several times to be shortened and put together again, and thus to be bundled with a rubber band. A bundle of the lines thus put together is placed on the support portion of the push-up member in the container of the ejection device. Then, the folded fabric portion (canopy portion) is wound around the bottomed cylindrical portion of the push-up member and stored in the container. After the parachute is stored in the container in this manner, the opening of the container is closed with the lid.

In the specific example 3, when the parachute is stored in the container, in order to prevent the folded fabric portion (canopy portion) from being spirally overlapped around the bottomed cylindrical portion of the push-up member when the folded fabric portion (canopy portion) makes one round around the bottomed cylindrical portion of the push-up member, it is preferable to store the parachute in a state in which the parachute is folded back such that the winding direction of the push-up member around the bottomed cylindrical portion is reversed, and wound around the bottomed cylindrical portion of the push-up member again. That is, when viewed from the opening side of the container, it is preferable to accommodate the parachute in the container in such a state that the folded fabric portion (canopy portion) folds back and meanders around the bottomed cylindrical portion of the push-up member every one round.

According to the specific examples 1 to 3 showing the method of folding the parachute, it is possible to smoothly deploy the ejected object (parachute) during the operation of the ejection device.

For the attachment height position of the container to the main body portion of the flying object in each of the above embodiments and modifications, when the bottom of the container has a vent hole (for example, in the case of the ejection device 100), in order to facilitate intake of outside air from the vent hole, the larger a gap between the bottom and the main body portion of the flying object, the better.

In each of the above embodiments and modifications, in order to prevent gas generated during operation of the gas generator from leaking out from the inside of the cylinder, a sealing member such as packing and an O-ring may be provided at a suitable position (position such as a side portion of the gas generator, where gas may leak out) in a cylinder.

REFERENCE SIGNS LIST 10, 410, 510, 610, 1010, 3310 Piston member
11, 411, 511, 611, 1011, 3311, 3511, 3611, 3711, 3811, 3911 Main body portion
12, 412, 512, 612, 1012, 3312 Rod-shaped portion
13, 413, 513, 613, 813, 913, 1013, 3313 Hole portion
14, 414, 514, 614, 814, 914, 1014, 3314 Cylinder
15, 415, 515, 615, 815, 915, 1015, 1615, 1715, 1815, 1915, 2015, 3015, 3115, 3215, 3315 Push-up member
16, 416, 1016, 1616, 3016, 3116, 3216, 3316, 4016, 4116 Ejected object
17, 417, 517, 617, 817, 917, 1017, 3317 Gas generator (power source)
18, 218, 318, 418, 1018, 1118, 1218, 1318, 1418, 1518, 1618, 2118, 2218, 2318, 2418, 2518, 2618, 3318, 3418, 3518, 3618, 3718, 3818, 3918 Container
19, 219, 319, 419, 519, 619, 819, 919, 1019, 1119, 1219, 1319, 1419, 1519, 1619, 1719, 1819, 1919, 2019, 3019, 3119, 3219, 3319 Bottomed cylindrical portion
20, 220, 340, 420, 520, 620, 820, 920, 1020, 1120, 1220, 1320, 1420, 1520, 1620, 1720, 1820, 1920, 2020, 3020, 3120, 3220, 3320 Support portion
21, 421, 1021, 1621, 3321, 3421, 3521, 3621, 3721, 3821, 3921 Lid
22, 422, 1022, 1622, 3322 Lid opening/closing mechanism
23, 423, 823, 923, 1023, 3323 Stopper
24, 424, 1024, 1124, 1224, 1424, 1524, 3324, 3524, 3624, 3924 Vent hole
30, 2130, 2230, 2330, 2430, 2530, 2630 Flying object
31, 445, 1045, 1645, 2145, 2245, 2345, 2445, 2545, 2645, 3345 Airframe
32, 2132, 2232, 2332, 2432, 2532, 2632, 3532, 3632, 3732, 3832, 3932 Propulsion mechanism
33, 2133, 2233, 2333, 2433, 2533, 2633, 3533, 3633, 3733, 3833, 3933 Leg portion
40, 1040, 1640, 2140, 2240, 2340, 2440, 2540, 2640 Connecting member
51 Ring gear (relay member)
51*a* External teeth
51*b* Internal teeth
60 Power transmission means
61 Power transmission member (relay member)
62 Pipe
63 Gas generator
64 Piston
70 Pretensioner cover
71 Passage
71*a* Passage terminus portion
80 Rotary shaft (relay member)
81 Pinion gear (relay member)
81*a* External teeth
90, 990 Bellows member
91, 991*a*. 991*b* Cylindrical portion
92, 992 Bellows-shaped portion
93, 993 Opening end
100, 200, 300, 400, 500, 600, 700, 800, 900, 1000, 1100, 1200, 1300, 1400, 1500, 1600, 2100, 2200, 2300, 2400, 2500, 2600, 2700, 2800, 2900, 3000, 3100, 3200 Ejection device
230, 330, 1330, 4016*a* Projecting portion
231, 331, 1131, 1231 Guide
341, 1341 Linear portion
430 Driving piston member
431 Main body portion
432 Rod-shaped portion
530, 630 Cover
531, 731 Pinion (relay member)
532 Protruding portion
533, 733 Rack (relay member)
633 Pressed member
634 Passage forming member
635 Ball (relay member)

1130, 1230, 2030, 3418a Recess
1625, 1725, 1825, 1925, 2025, 4025, 4125 Line (connecting member)
1850 Temporary tack band
1960 Restraining member
2241 Bolt
2334, 2534, 3534, 3634, 3734, 3834, 3934 Arm portion
3421a Protrusion
3551, 3651, 3751, 3851, 3951 Holding portion
3551a. 3651a. 3751a. 3851a. 3951a Base portion
3551b. 3651b. 3751b. 3851b. 3951b Arm portion
3552 Cylindrical member
3553 Disk-shaped member
3560, 3660, 3760, 3860, 3960 Drop detection device
3561, 3661, 3761, 3861, 3961 Battery
3653 Plate-shaped member
3953 Placement portion

The invention claimed is:

1. An ejection device comprising:
a sliding member;
a cylinder that accommodates the sliding member inside and includes a hole portion configured to allow the sliding member to project outward from the inside during operation;
a push-up member that has a bottomed cylindrical portion disposed to cover at least a portion of the cylinder and a flange-like portion formed to project outward from an opening portion of the bottomed cylindrical portion or an intermediate portion of a side surface of the bottomed cylindrical portion and is pushed up in one direction by the sliding member;
an ejected object pushed up while being supported by the flange-like portion of the push-up member; and
a power source that moves the sliding member in the cylinder such that the sliding member projects outward from the inside.

2. The ejection device according to claim 1, wherein a support portion of the bottomed cylindrical portion is partially removed in a wall portion by drilling or mesh processing.

3. The ejection device according to claim 1, wherein the flange-like portion includes a plurality of projecting portions formed into a disc shape or a polygon, or formed radially.

4. The ejection device according to claim 1, further comprising a container that accommodates the sliding member, the cylinder, the push-up member, the ejected object, and the power source.

5. The ejection device according to claim 4, wherein the ejected object is accommodated in a portion of the container between an inner surface of the container and an outer surface of the bottomed cylindrical portion.

6. The ejection device according to claim 4, wherein a lid is provided at an end of the container on a downstream side in an ejection direction of the ejected object.

7. The ejection device according to claim 4, wherein the container includes a vent hole that suppresses negative pressure generated between the container and the push-up member during operation.

8. The ejection device according to claim 1, further comprising a driving sliding member that is provided in the cylinder and moves the sliding member in a contact or non-contact manner.

9. The ejection device according to claim 1, further comprising a relay member that receives pressure from the power source and moves the sliding member.

10. The ejection device according to claim 1, wherein the ejected object includes a lift force generating member having a control line, and the ejection device further comprising a steering mechanism connected to the control line such that the lift force generating member is steerable.

11. A flying object comprising:
a. an airframe;
b. the ejection device according to claim 1 coupled to the airframe; and
c. a propulsion mechanism coupled to the airframe and propelling the airframe.

* * * * *